United States Patent
Sato et al.

(10) Patent No.: US 10,850,653 B2
(45) Date of Patent: *Dec. 1, 2020

(54) SEAT

(71) Applicant: TS TECH CO., LTD., Asaka (JP)

(72) Inventors: Kohei Sato, Tochigi (JP); Takayoshi Ito, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,171

(22) Filed: Mar. 19, 2019

(65) Prior Publication Data

US 2019/0210495 A1    Jul. 11, 2019

Related U.S. Application Data

(63) Continuation of application No. 15/567,726, filed as application No. PCT/JP2016/073566 on Aug. 10, 2016, now Pat. No. 10,259,360.

(30) Foreign Application Priority Data

Sep. 8, 2015 (JP) ................................ 2015-177090
Sep. 8, 2015 (JP) ................................ 2015-177091

(51) Int. Cl.
*B60N 2/56* (2006.01)
*A47C 7/74* (2006.01)
*B60N 2/00* (2006.01)

(52) U.S. Cl.
CPC ............ *B60N 2/5678* (2013.01); *A47C 7/748* (2013.01); *B60N 2/002* (2013.01); *B60N 2/5685* (2013.01)

(58) Field of Classification Search
CPC .... B60N 2/002; B60N 2/5678; B60N 2/5685; A47C 7/748
(Continued)

(56) References Cited

U.S. PATENT DOCUMENTS

| 5,981,918 | A | 11/1999 | Topp et al. |
| 6,073,998 | A | 6/2000 | Siarkowski et al. |

(Continued)

FOREIGN PATENT DOCUMENTS

| JP | H05220026 | 8/1993 |
| JP | 2009269480 | 11/2009 |

(Continued)

OTHER PUBLICATIONS

Office Action issued for Japanese Patent Application No. 2015-177090, dated Apr. 2, 2019, 8 pages including English translation.

(Continued)

*Primary Examiner* — Rodney B White
(74) *Attorney, Agent, or Firm* — Hamre, Schumann, Mueller & Larson, P.C.

(57) ABSTRACT

A car seat includes a first heater, a second heater, and a control unit which controls an output to the first heater and an output to the second heater. The control unit executes a temperature-difference adjustment control, in which the output of the second heater is controlled such that the temperature of the bulging portion heated by the second heater with respect to the temperature of the seating surface portion heated by the first heater is made lower when an ambient temperature is a first temperature than when the ambient temperature is a second temperature which is higher than the first temperature.

8 Claims, 15 Drawing Sheets

(58) Field of Classification Search
USPC .......................... 297/180.12, 180.13, 180.14
See application file for complete search history.

(56) References Cited

U.S. PATENT DOCUMENTS

| | | | |
|---|---|---|---|
| 6,104,972 | A | 8/2000 | Miyamoto et al. |
| 6,541,737 | B1 | 4/2003 | Eksin et al. |
| 6,552,442 | B2 | 4/2003 | Liao et al. |
| 6,914,217 | B2 | 7/2005 | Fristedt |
| 7,205,510 | B2 * | 4/2007 | Howick ............... B60N 2/5685 297/180.12 X |
| 7,477,969 | B2 | 1/2009 | Panic |
| 7,731,279 | B2 | 6/2010 | Asada et al. |
| 7,866,743 | B1 | 1/2011 | Russell et al. |
| 8,047,274 | B2 * | 11/2011 | Oomura ................ B60H 1/004 165/202 |
| 8,523,279 | B2 * | 9/2013 | Nakamura ........... B60N 2/5685 297/180.1 |
| 8,752,891 | B2 * | 6/2014 | Yoshimoto ............. A47C 7/748 297/180.12 |
| 9,150,132 | B2 | 10/2015 | Hoke et al. |
| 10,259,360 | B2 * | 4/2019 | Sato ....................... A47C 7/748 |
| 2005/0040682 | A1 | 2/2005 | Ulbrich |
| 2005/0085968 | A1 | 4/2005 | Panic |
| 2006/0175877 | A1 * | 8/2006 | Alionte ................ B60N 2/5635 297/180.14 |
| 2009/0000778 | A1 | 1/2009 | Nathan et al. |
| 2010/0052374 | A1 | 3/2010 | Bell et al. |
| 2010/0096379 | A1 | 4/2010 | Asami et al. |
| 2012/0049586 | A1 | 3/2012 | Yoshimoto et al. |
| 2013/0069673 | A1 | 3/2013 | Virnich et al. |
| 2014/0130516 | A1 | 5/2014 | Lofy |
| 2014/0151356 | A1 * | 6/2014 | Maguire .................. B62D 1/06 219/204 |
| 2014/0217785 | A1 | 8/2014 | Arens et al. |
| 2015/0115669 | A1 | 4/2015 | Kagan et al. |
| 2015/0239379 | A1 * | 8/2015 | Yoshida ................. A47C 7/748 297/180.12 |
| 2016/0003882 | A1 | 1/2016 | Loftus |
| 2016/0031348 | A1 | 2/2016 | Kurosawa et al. |
| 2016/0325656 | A1 | 11/2016 | Ziolek et al. |
| 2019/0111813 | A1 * | 4/2019 | Hoshi ...................... A47C 7/74 |
| 2019/0210495 | A1 * | 7/2019 | Sato ..................... B60N 2/5678 |

FOREIGN PATENT DOCUMENTS

| | | |
|---|---|---|
| JP | 2010040185 | 2/2010 |
| JP | 2014069660 | 4/2014 |

OTHER PUBLICATIONS

Office Action issued for Japanese Patent Application No. 2015-177091, dated Apr. 2, 2019, 6 pages including English translation.
International Search Report for International Application No. PCT/JP2016/073566, dated Nov. 15, 2016, 6 pages including English translation.
Office Action issued for Chinese Patent Application No. 201680019377.9, dated Dec. 5, 2018, 11 pages including English translation.

* cited by examiner (a)

| OCCUPANT'S WEIGHT WT | MAIN HEATER | CUSHION SUB-HEATER | BACK SUB-HEATER |
|---|---|---|---|
| WT ≥ WT2 | ON | ON | ON |
| WT2 > WT ≥ WT1 | ON | ON | OFF |
| WT1 > WT ≥ WT0 | ON | OFF | OFF |
| WT < WT0 | OFF | OFF | OFF | ns
SEAT

TECHNICAL FIELD

The present invention relates to a seat of which, a seating surface can be heated.

BACKGROUND ART

As a seat of which a seating surface can be heated, a seat that includes a plurality of heaters disposed corresponding to each area of contact made by an occupant seated in the seat (seated person) and a control section (controller) which controls a heat generation operation has been disclosed in Patent Literature 1 for example. The seat in Patent Literature 1, based on the premise that among the contact parts of a human body, there exist parts that feel warmth quickly and having high heating effectiveness to heat supply, while there exists parts that feel warmth slowly and insensible but once warmed, improve the comfort, is configured to heat these two types of parts in order.

CITATION LIST

Patent Literatures

Patent Literature 1: Japanese Patent Application Laid-open Publication No. 2009-269480

SUMMARY OF THE INVENTION

Incidentally, in the conventional seat, with an object of improving the comfort, an output of each heater is controlled such that there is no substantial temperature difference between areas that are heated by the heaters. However, when a plurality of areas to be heated by the heaters are heated up equally, there would be a problem of an electric power consumption becoming large.

The present invention has been made in view of the above-described circumstances, and a primary object of the present invention is to provide a seat which enables to suppress electric power consumption while providing comfort.

To achieve the primary object, the seat of the present invention comprises: a first heater which heats up a first area; a second heater which heats up a second area; and a control unit which controls an output of the first heater and an output of the second heater in accordance with an ambient temperature, wherein the control unit executes a temperature-difference adjustment control, in which the output of the second heater is controlled such that a temperature of the second area with respect to a temperature of the first area is made lower when the ambient temperature is a first temperature than when the ambient temperature is a second temperature which is higher than the first temperature, to thereby increase a difference in temperature between the first area and the second area.

According to such configuration, the output of the second heater is controlled such that the temperature of the second area with respect to the temperature of the first area is made lower when the ambient temperature is the first temperature (low ambient temperature) than when the ambient temperature is the second temperature (high ambient temperature), and therefore the electric power consumption can be suppressed without giving a feeling of discomfort to the occupant; this is because when the ambient temperature is the first temperature, even if the difference between the temperature of the first area and the temperature of the second area is large, the temperature difference is hard to be sensed by the occupant. Whereas, when the ambient temperature is the second temperature (high ambient temperature), the temperature difference is easy to be sensed by the occupant even if the difference between the temperature of the first area and the temperature of the second area is not large. However, in this instance, the difference between the temperature of the first area and the temperature of the second area becomes smaller as compared with the instance in which the ambient temperature is the first temperature (low ambient temperature). Therefore, it is possible to secure the comfort.

The above seat may further comprise a temperature sensor which is provided to an area corresponding to the first heater, and in the temperature-difference adjustment control, the control unit may calculate a first required control amount on the basis of a target temperature and a detected temperature acquired by the temperature sensor, and control the first heater with the first required control amount, and calculate a second required control amount on the basis of the first required control amount, and control the second heater with the second required control amount. A magnitude of the second required control amount with respect to a magnitude of the first required control amount nay be smaller when the ambient temperature is the first temperature than when the ambient temperature is the second temperature.

With this configuration, it is possible to control the output of the second heater such that the temperature of the second area with respect to the temperature of the first area is made lower, with only the temperature sensor provided to the area corresponding to the first heater, and to suppress the electric power consumption while providing comfort.

In the above seat, upon receiving an instruction for heating up the seat, the control unit may supply an electric power only to the first heater if the detected temperature has not reached a switching temperature which is lower than the target temperature.

With this configuration, the first area can be heated up first, so that if, for example, the first heater is provided to an area where the occupant can feel the temperature easily, such area can be heated up promptly to improve the comfort.

In the above seat, the control unit may execute: to calculate an accumulated electric power consumption obtained by adding an amount of electric power outputted to the first heater at every predetermined time until the detected temperature reaches the switching temperature; to supply a maximum electric power output to the second heater if the detected temperature has reached the switching temperature, and to subtract a value obtained by multiplying an amount of electric power outputted to the second heater at every predetermined time by a temperature-difference adjustment value that varies according to the ambient temperature from the accumulated electric power consumption to obtain a solution; and to execute the temperature-difference adjustment control if the solution obtained is not higher than a predetermined value. And, the temperature-difference adjustment value may be larger when the ambient temperature is the first temperature than when the ambient temperature is the second temperature.

With this configuration, after the first area is heated up, the second area is heated up promptly to bring the temperature of the second area closer to the temperature of the first area promptly, thereby improving the comfort. Moreover, when the ambient temperature is the first temperature (low ambient temperature), the accumulated electric power consumption becomes not higher than the predetermined value quickly and the temperature-difference adjustment control is executed, as compared with the case when the ambient temperature is the second temperature (high ambient temperature), so that the time for which the second heater operates with the maximum output can be shortened. Accordingly, the second area is not heated wastefully by the second heater, and the electric power consumption can be suppressed.

The above seat may further comprise a first sensor which is provided to an area corresponding to the first heater, and a second sensor which is provided to an area corresponding to the second heater, and in the temperature-difference adjustment control, the control unit may calculates a first required control amount on the basis of a first target temperature and a first detected temperature acquired by the first temperature sensor, and control the first heater with the first required control amount, and calculate a second required control amount on the basis of a second target temperature and a second detected temperature acquired by the second sensor, and control the second heater with the second required control amount. A difference between the first target temperature and the second target temperature may be larger when the ambient temperature is the first temperature than when the ambient temperature is the second temperature.

With this configuration, the output of the second heater can be controlled such that the temperature of the second area with respect to the temperature of the first area lower is made lower. It is therefore possible to suppress the electric power consumption while providing comfort. Moreover, since the temperature sensor is provided to both of the area corresponding to the first heater and the area corresponding to the second heater, it is possible to improve an accuracy of temperature control, and to improve the comfort.

In the above seat, before executing the temperature-difference adjustment control, the control unit may supply a maximum electric power output to the second heater if the second detected temperature has not reached a second switching temperature which is lower than the second target temperature.

With this configuration, the second area can be heated up promptly to improve the comfort.

In the above seat, when the second detected temperature has reached the second switching temperature, the control unit may execute the temperature-difference adjustment control. The second switching temperature may be lower when the ambient temperature is the first temperature than when the ambient temperature is the second temperature.

With this configuration, when the ambient temperature is the first temperature (low ambient temperature), the second detected temperature reaches the second switching temperature quickly and the temperature-difference adjustment control is executed, as compared with the case when the ambient temperature is the second temperature (high ambient temperature), so that the time for which the second heater operates with the maximum output can be shortened. Accordingly, the second area is not heated wastefully by the second heater, and the electric power consumption can be suppressed.

In the above seat, upon receiving an instruction for heating up the seat, the control unit may supply an electric power only to the first heater if the first detected temperature has not reached a first switching temperature which is lower than the first target temperature.

With this configuration, the first area can be heated up first, so that if, for example, the first heater is provided to an area where the occupant can feel the temperature easily, such area can be heated up promptly to improve the comfort.

In the above seat, the first heater may be provided to a seating surface portion of the seat, and the second heater may be provided to a bulging portion which is disposed on left and right outer sides of the seating surface portion, and which juts out toward an occupant seated in the seat for supporting a side portion of the occupant.

With this configuration, since the seating surface portion where the occupant feels the temperature easily can be heated up by the first heater, it is possible to improve the comfort. On the contrary, for the bulging portion which is disposed farther from the occupant than the seating surface portion, the occupant is not likely to feel discomfort even if there is some temperature difference between the temperature of the bulging portion and the temperature of the seating surface portion. Therefore, the electric power consumption can be suppressed further while suppressing the output of the second heater further.

Herein, the seating surface portion refers to a seating surface portion of a seat cushion or a seat back, and the bulging portion refers to a portion of the seat cushion or the seat back that juts out. The seating surface portion of the seat cushion is a portion of the seat cushion on which hips and thighs of the occupant rest, more specifically, a portion for supporting the hips and thighs of the occupant from below. The seating surface portion of the seat back is a portion of the seat back at which a back of the occupant contacts, more specifically, a portion for supporting the back of the occupant from behind.

Incidentally, different physiques of occupants sit in the seat; some heaters may contact with the occupant if an occupant with a large body frame sits therein, but may not contact with the occupant if an occupant with a small body frame sits therein. However, the conventional technology does not take into consideration the physique of the occupant seated in the seat, heaters not in contact with the occupant would generate heat wastefully when an occupant with a small body frame sits in the seat, which disadvantageously leads to large amount of electric power consumption.

The present invention has been made in view of the above-described circumstances, and a second object of the present invention is to provide a seat capable of reducing the electric power consumption.

To achieve the second object, the seat may further comprise a physique detector which detects a physique of an occupant seated in the seat. The first heater may be a main heater, and the second heater may be a sub-heater that is disposed at a position farther from the seating surface portion of a seat cushion, than the main heater. And, the control unit may reduce at least a partial output of the sub heater when the physique of the occupant detected by the physique detector is smaller than a standard than when the physique of the occupant detected by the physique detector is not smaller than the standard.

With this configuration, at least a part of the sub-heater disposed at a position farther from the seating surface portion of the seat cushion, than a position of the main heater, does not contact with the occupant when an occupant with a small body frame sits on the seat cushion; therefore, even if the part of the sub-heater is caused to generate heat, it does not contribute so much to the comfort of the occupant. For this reason, if the physique of the occupant is smaller than the standard, at least a partial output of the sub-heater is made lower, so that a wasteful heat generation by the heater portion not in contact with the occupant is suppressed, which can reduce the electric power consumption.

Herein, the seating surface portion of the seat cushion refers to a portion of the seat cushion on which the hips and thighs of the occupant rest, more specifically, a portion which supports the hips and thighs of the occupant from below.

In the above seat, the sub-heater may be disposed on left and right outer sides of the main heater.

In the above seat, the control unit may stop the electric power supply to at least a part of the sub-heater if the physique of the occupant detected by the physique detector is smaller than the standard.

With this configuration, since the electric power supply to the heater portion not in contact with the occupant is ceased, the electric power consumption can be reduced further.

In the above seat, the sub-heater may include a plurality of heater portions. And, the control unit may control, if the physique of the occupant detected by the physique detector is smaller than the standard, such that the farther the position of the heater portion from among the plurality of heater portions, disposed from the seating surface portion of a seat cushion, the smaller is the output.

With this configuration, the temperature of the sub-heater can be controlled to be gradually lowered from the heater portion disposed at a position closer to the seating surface portion of the seat cushion toward the heater portion disposed at a position farther from the seating surface portion of the seat cushion, so that increased temperature difference between the heater portions can be suppressed. This can improve the comfort of the occupant.

In the above seat, the sub-heater may include: a first heater portion; a second heater portion which is disposed at a position farther from the seating surface portion of the seat cushion, than a position of the first heater portion; and a third heater portion which is disposed at a position farther from the seating surface portion of the seat cushion, than a position of the second heater portion. And, the control unit may control, if the physique of the occupant detected by the physique detector is smaller than the standard, such that an output of the sub-heater is made smaller in order of the first heater portion, the second heater portion, and the third heater portion.

With this configuration, the temperature of the sub-heater can be controlled to be gradually lower toward a direction away from the seating surface portion of the seat cushion, in order of the first heater portion, the second heater portion, and the third heater portion, so that increased temperature difference between the heater portions can be suppressed. This can improve the comfort of the occupant.

In the above seat, the sub-heater may be disposed on left and right sides of the main heater, and the first heater portion, the second heater portion, and the third heater portion may be disposed side-by-side in this order from an inner side to an outer side in the leftward-rightward direction.

In the above seat, the main heater may include a cushion main-heater which is disposed on the seating surface portion of the seat cushion, and a back main-heater which is disposed on a seating surface portion of a seat back. And, the sub-heater may include a cushion sub-heater which is disposed on left and right outer sides of the seating surface portion of the seat cushion, and a back sub-heater which is disposed on left and right outer sides of the seating surface portion of the seat back. The control unit may stop the electric power supply to the back sub-heater if the physique of the occupant detected by the physique detector is smaller than a first standard, and stops the electric power supply to the back sub-heater and the cushion sub-heater if the physique of the occupant detected by the physique detector is smaller than a second standard which is smaller than the first standard.

With this configuration, if the physique of the occupant is smaller than the first standard, the electric power supply to the back sub-heater is ceased, and if the physique of the occupant is further smaller, the electric power supply to the back sub-heater and the cushion sub-heater is ceased, so that the electric power consumption can be reduced further while maintaining the comfort in accordance with the physique of the occupant.

Herein, the seating surface portion of the seat back refers to a portion of the seat back at which the back of the occupant contacts, more specifically, a portion for supporting the back of the occupant from behind.

In the above seat, the main heater may be provided to the seating surface portion of the seat, and the sub-heater may be provided to a bulging portion which is disposed on left and right outer sides of the seating surface portion, and which juts out toward the occupant for supporting a side portion of the occupant.

With this configuration, on the one hand, the seating surface portion of which the temperature is felt easily by the occupant can be heated by the main heater to maintain the comfort. On the other hand, the left and right bulging portions can be heated by the sub heater in accordance with the physique of the occupant to reduce the electric power consumption.

Herein, the seating surface portion of the seat refers to the seating surface portion of the seat back or of the seat cushion, and the bulging portion refers to a bulging portion of the seat back or the seat cushion.

BRIEF DESCRIPTION OF THE DRAWINGS

FIG. 11 is a table showing output of each heater with respect to weight of an occupant seated in the car seat, in a third embodiment.

DESCRIPTION OF EMBODIMENTS

Embodiments of a seat according to the present invention will be described below with reference to the accompanying drawings.

First Embodiment

Figure 1:
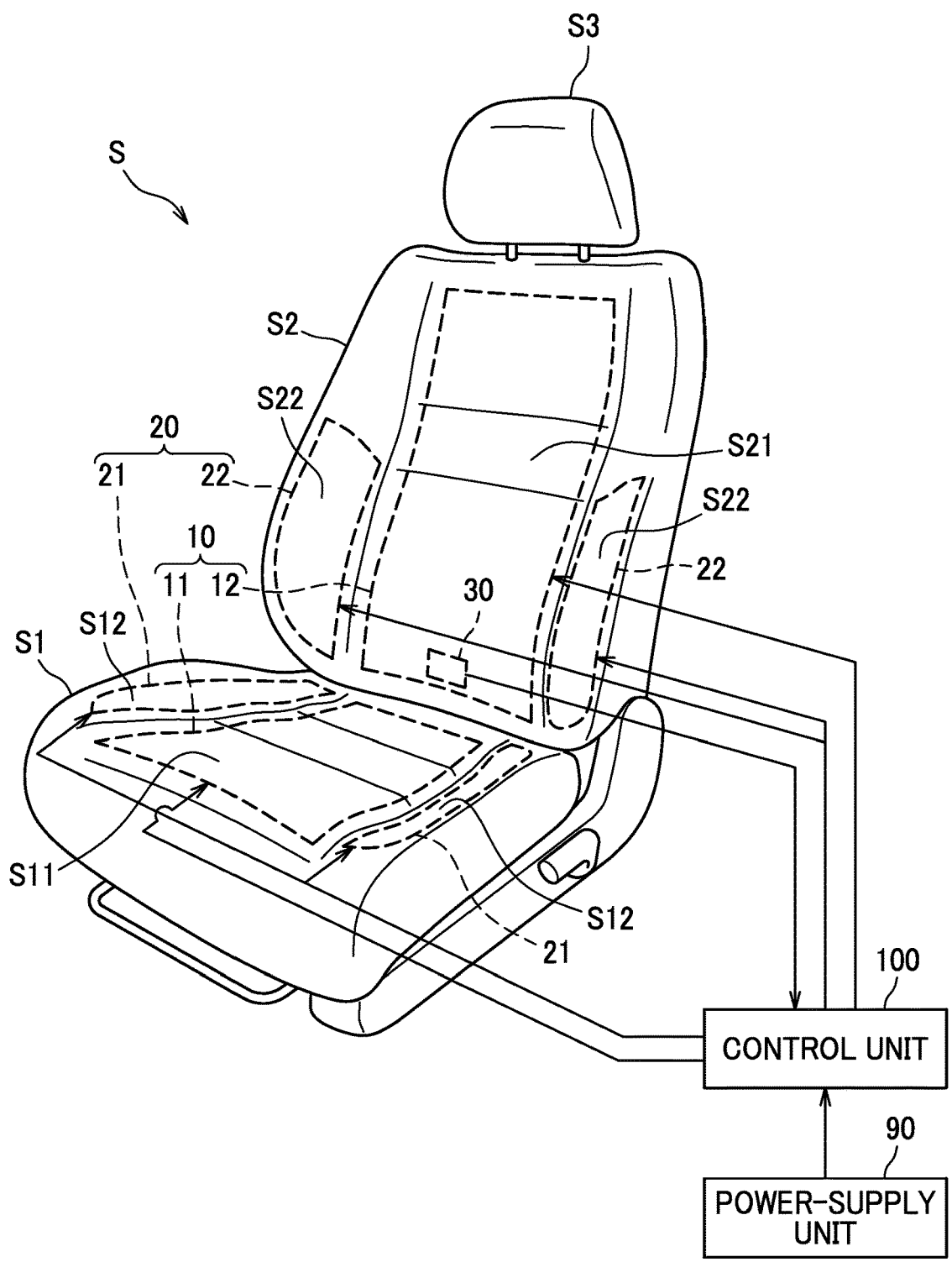
FIG. 1 is a perspective view of a car seat as a seat according to a first embodiment.

A seat in the present embodiment, as shown in FIG. 1, is configured as a car seat S which is to be mounted in an automobile. This car seat S includes a seat cushion S1, a seat back S2, and a headrest S3; the seat cushion S1 is formed by upholstering a pad material made of a cushion material such as urethane foam with a skin material such as synthetic leather and cloth.

The seat cushion S1 includes a seating surface portion S11 which is disposed at a horizontal center, and which supports hips and thighs of an occupant seated in the car seat S from below by making a contact, and a bulging portion S12 which is disposed on both left and right outer sides of the seating surface portion S11, and which is jutted out toward the occupant for supporting a side portion of the thighs and hips of the occupant. Moreover, the seat back S2 also similarly includes a seating surface portion S21 which is disposed at a horizontal center, and which supports a back of the occupant from behind by making a contact with the back, and a bulging portion S22 which is disposed on both left and right outer sides of the seating surface portion S21, and which is jutted out toward the occupant for supporting a side portion of an upper body of the occupant.

Center heaters 11 and 12 as a first heater 10 are disposed at an inner side of the skin of the seating surface portion S11 of the seat cushion S1 and at an inner side of the skin of the seating surface portion S21 of the seat back S2 respectively. Moreover, side heaters 21 and 22 as a second heater 20 are disposed at an inner side of the skin of the bulging portion S12 of the seat cushion S1 and the bulging portion S22 of the seat back S2 respectively. In other words, in the present embodiment, the seating surface portions S11 and S21 provided with the first heater 10 correspond to a first area that is to be heated by the first heater 10, and the bulging portions S12 and S22 provided with the second heater 20 correspond to a second area that is to be heated by the second heater 20.

In the seating surface portion S21 of the seat back S2, a temperature sensor 30 is built-in in an area corresponding to the first heater 10, at the inner side of the skin. The temperature sensor 30 is disposed at a position where there is no effect of a body temperature of the occupant. For example, the temperature sensor 30 may be disposed at a lower portion of the seat back S2 and at a rear portion of the seat cushion S1. There is a substantially constant correlation between a temperature detected by the temperature sensor 30 and a temperature of a portion of the seating surface portion S21 with which the occupant makes a contact. A control unit 100 may carry out a control by using the temperature detected by the temperature sensor 30 as a detected temperature, or may carry out a control by estimating the temperature of the portion with which the occupant makes a contact on the basis of the above-described correlation, and letting the temperature estimated to be a detected temperature T.

The control unit 100 is disposed at an appropriate position of the car seat S. The temperature sensor 30 is connected to the control unit 100 to output a signal of the detected temperature T to the control unit 100. Moreover, the first heater 10 and the second heater 20 are connected to the control unit 100. Furthermore, the control unit 100 is configured such that an electric power is supplied to the control unit 100 from a power-supply unit 90 which is driven by a battery mounted in a vehicle, and the control unit 100 controls an output of the first heater 10 and an output of the second heater 20 on the basis of the detected temperature T acquired from the temperature sensor 30. In the present embodiment, the power-supply unit 90 is configured to supply the electric power within a range of a predetermined upper-limit output for the first heater 10 and the second heater 20 of the car seat S, and as an example, an upper limit is let to be 100 W.

The control unit 100 is connected to an operation switch of a heater mounted in the vehicle, and controls the first heater 10 and the second heater 20 upon receiving an instruction for heating the car seat S from the operation switch. The control unit 100 is configured to execute a first stage of raising promptly a temperature of the seating surface portions S11 and S21 with which the occupant makes a contact, by heating the first heater 10 intensively during a heating period of raising the detected temperature T toward a target temperature T12 upon receiving the instruction for heating from the operation switch, a second stage of starting the heating of the second heater 20 and bringing a temperature of the bulging portions S12 and S22 closer to the temperature of the seating surface portions S11 and S21, and a third stage of adjusting the detected temperature T to the target temperature T12 after the temperature of the bulging portions S12 and S22 has risen to some extent.

During the warm season, and in cases such as when the heater has been used once before the operation of the operation switch, sometimes the detected temperature T may be higher than the target temperature T12 already, when the instruction for heating has been received by the operation switch. In that case, the control unit 100, without executing the control of the so-called heating period here, carries out a control similar to the third stage.

The control unit 100, as a standard for switching from the first stage to the second stage, makes a judgment of whether or not the detected temperature T has reached a switching temperature T11 which is lower than the target temperature T12. In the first stage in which the detected temperature T has not reached the switching temperature T11, the control unit 100 supplies the electric power only to the first heater 10, and without supplying the electric power to the second heater 20, controls the first heater 10 by a 100% first output proportion.

In the present embodiment, a proportion of the output of the first heater 10 with respect to the maximum output is referred to as a first output proportion, and a proportion of the output of the second heater 20 with respect to the maximum output is referred to as a second output proportion. Moreover, to make the description easily understandable, when the maximum output of the first heater 10 and the maximum output of the second heater 20 are exemplified, the maximum output of the first heater 10 is let to be 100 W which is same as a total of the maximum permissible output (100 W) of the first heater 10 and the second heater 20, and the maximum output of the second heater is let to be 50 W. In other words, in a case of the first heater 10 outputting with 100% in the first stage, the electric power of 100 W is to be supplied.

Moreover, the control unit 100 does not return the processing to the first stage after the processing advanced to the second stage upon the detected temperature T once reaching the switching temperature T11. Therefore, if the detected temperature T has reached the switching temperature T11, the control unit 100 sets a flag F to 1, indicating that the detected temperature T has reached the switching temperature T11. An initial value of the flag F is 0, and when the electric power is ceased to be supplied to the control unit 100 in a case such as when the operation switch has been switched OFF, the flag F is reset to 0.

The control unit 100, in the second stage after the detected temperature T has reached the switching temperature T11, lets the second output proportion to be 100% in order to bring the temperature of the bulging portions S12 and S22 closer to the temperature of the seating surface portions S11 and S21 by using fully the capacity of the second heater 20, and lets the first output proportion to be an appropriate value within the range of the maximum permissible output. Consequently, the control unit 100, in the second stage, supplies the electric power to the second heater 20 with the maximum output, which is 100% second output proportion. In other words, the control unit 100 supplies the electric power of 50 W to the second heater 20. On the other hand, for controlling the first heater 10, the control unit 100 calculates a first required control amount mv1 on the basis of the target temperature T12 and the detected temperature T acquired by the temperature sensor 30. It is possible to calculate the first required control amount mv1 by mv1=$K_p \times e + ie/K_i$, as a required control amount of a so-called PI control for example.

Here, e is a difference between the target temperature T12 and the detected temperature T, $K_p$ is a proportional control constant, ie is an integral (addition) of e in a predetermined period in the past, and $K_i$ is an integral control constant. The constants $K_p$ and $K_i$ are set to be such that the first required control amount mv1 can be used as an instruction value of the output (a value that instructs the first output proportion and the second output proportion) in the third stage after the detected temperature T has come closer to the target temperature T12. Moreover, the detected temperature T and the target temperature T12, for the purpose of calculation here, may not be necessarily in units such as "° C.", and may be a numerical value of a voltage output from the temperature sensor 30. It is preferable to adjust the constants $K_p$ and $K_i$ appropriately according to a scale of these values of temperature. The value mv1, according to the calculation, sometimes surpasses 100 as a result of the large difference e between the target temperature T12 and the detected temperature T in the first stage and the second stage (namely, state of heating with the as large output as possible). Since the electric power of a value of the output proportion (0% 100%) is supplied to the first heater 10 and the second heater 20, in order that mv1 assumes a numerical value not higher than 100, when mv1 surpasses 100, it is let to be 100. In other words, mv1 is calculated in a range below 100 which is an upper limit value.

In the second stage, since the electric power of 50 W is supplied to the second heater 20, of the maximum permissible output 100 W, the remainder is 50 W. Therefore, in the second stage, since it is necessary to control the first heater at not more than 50 W, if the first required control amount mv1 that has been calculated is larger than 50, the control unit 100 controls the first heater 10 by 50 W, or in other words, controls with 50% first output proportion, and if the first required control amount mv1 is not more than 50, the control unit 100 controls the first heater 10 letting the first required control amount mv1 that has been calculated to be the first output proportion. Accordingly, the first heater 10 is controlled by the output proportion not more than 50% in the second stage.

The switching from the second stage to the third stage is carried out when the temperature of the bulging portions S12 and S22 has come closer to certain extent to the temperature of the seating surface portions S11 and S21. In the present embodiment, one temperature sensor 30 being only provided to the seating surface portion S21, the control unit 100 presumes that the temperature of bulging portions S12 and S22 has come closer to the temperature of the seating surface portions S11 and S21 on the basis of an amount of heat supplied to seating surface portions S11 and S12 by the first heater 10 from the start of heating, or in other words, on the basis of the accumulated electric power consumption.

Here, for example, when a thermal capacity of the seating surface portions S11 and S21 and a thermal capacity of the bulging portions S12 and S22 are same, temperatures of both portions at the time of start of heating are same, and the total amount of heat supplied to the seating surface portions S11 and S21 and the bulging portions S12 and S22 is same, the temperature of both the portions should rise up to almost same temperature. As a matter of course, the temperature of the portion for which the heating was started earlier, being high for a long time, an amount of heat released becomes large, and therefore, although the temperature does not match precisely, if an amount of heat to be supplied is adjusted on the basis of a test result of heating, it is possible to adjust to a temperature of almost the same level. Similarly for a difference in the thermal capacity of the seating surface portions S11 and S21 and the bulging portions S12 and S22, by adjusting the amount of heat to be supplied on the basis of a test result of heating, it is possible to adjust to an equal temperature even if the electric power is supplied to the first heater 10 in advance. Moreover, using such tendency, by adjusting the amount of heat to be supplied to the second heater 20 for example, it is also possible to provide a desired temperature difference between the seating surface portions S11 and S21, and the bulging portions S11 and S21.

In the present embodiment, the control unit 100 sums up values in which an amount of the electric power (watts) outputted to the first heater 10 is multiplied by a predetermined first coefficient A1 for a predetermined time such as for each cycle of control (such as 10 m sec) for example, letting the accumulated electric power consumption to be W. In other words, till the detected temperature T reaches the switching temperature T11, in the first stage of making the first heater 10 output with 100% (100 W), the control unit 100 calculates the accumulated electric power consumption W by W=W+100×A1.

Moreover, in the second stage, since the control unit 100 controls the first heater 10 by 50 W (50%) or letting a value of the first required control amount mv1 to be the first output proportion, the control unit 100 adds the accumulated electric power consumption W to 50×A1 or mv1×A1 for each control cycle.

On the other hand, the control unit 100, in the second stage, subtracts from the accumulated electric power consumption, a value obtained by multiplying the amount of electric power supplied to the second heater 20 by a second coefficient 2 and a temperature-difference adjustment value A3 which varies according to a temperature of the environment (ambient temperature) in which the car seat S is disposed. In other words, in the second stage, since the second heater 20 is controlled by 50 W which is the maximum output of the second heater 20, value 50×A2×A3 is subtracted from the accumulated electric power consumption W.

Moreover, when the accumulated electric power consumption W becomes not more than a predetermined value such as 0, the control unit 100 terminates the second stage, then shifts the processing to the third stage, and executes a temperature-difference adjustment control which will be described later.

In the present embodiment, the second coefficient A2 is larger than the first coefficient A1, and as an example, the first coefficient A1 is 0.01 and the second coefficient A2 is 0.04.

Figure 2:
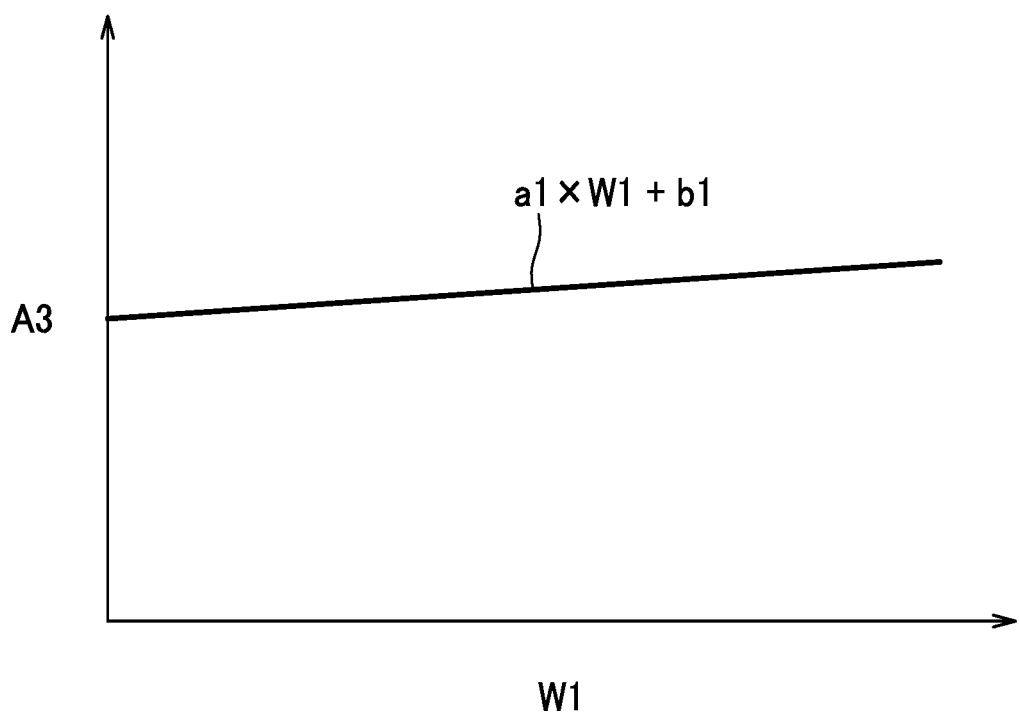
FIG. 2 is a map showing a relationship of accumulated electric power consumption and temperature-difference adjustment value in the first embodiment.

Moreover, the temperature-difference adjustment value A3, as an example, can be calculated by A3=a1×W1+b1. Here, W1 is an accumulated electric power consumption when the detected temperature T has reached the switching temperature T11. As shown in FIG. 2, the temperature-difference adjustment value A3 has been set such that as W1 becomes larger, the value becomes larger.

Figure 4:
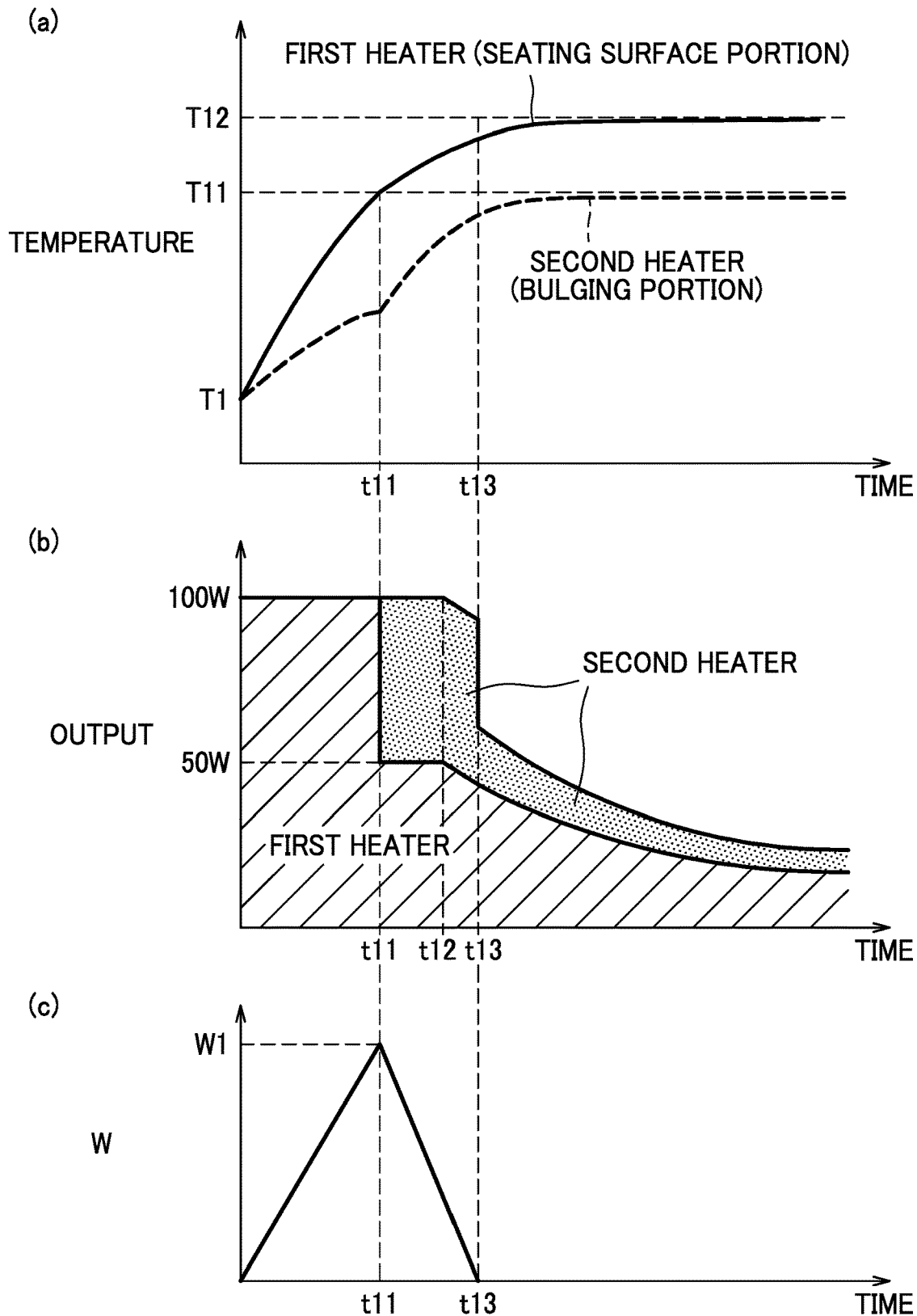
FIG. 4 includes a graph (a) showing a change in temperature of a seating surface portion and a bulging portion when an ambient temperature is a first temperature, a graph (b) showing an output of a first heater and an output of a second heater, and a graph (c) showing an accumulated electric power consumption W, in the first embodiment.
Figure 5:
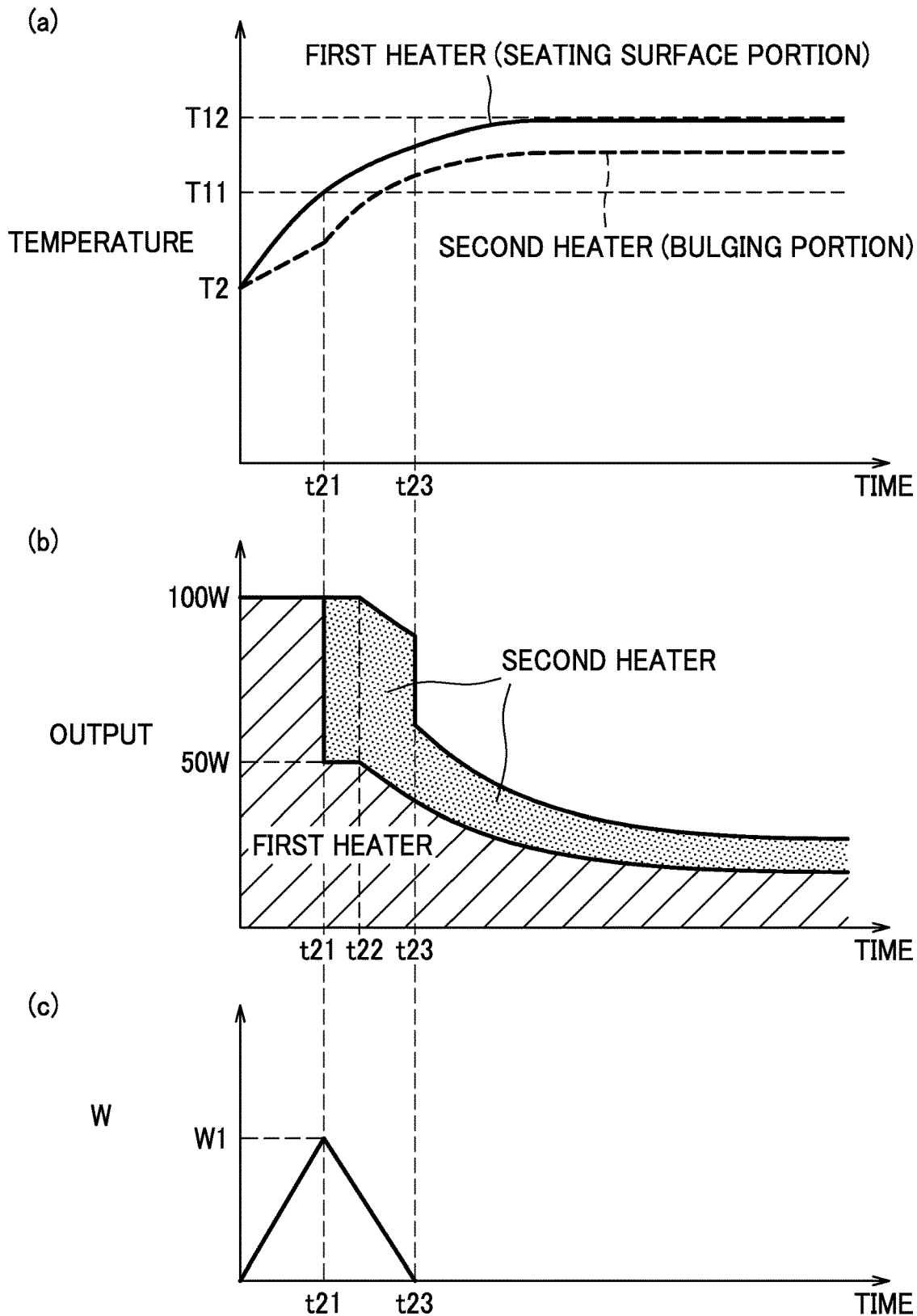
FIG. 5 includes a graph (a) showing a change in temperature of the seating surface portion and the bulging portion when the ambient temperature is a second temperature which is higher than the first temperature, a graph (b) showing an output of the first heater and the output of the second heater, and a graph (c) showing the accumulated electric power consumption W, in the first embodiment.
Figure 6:
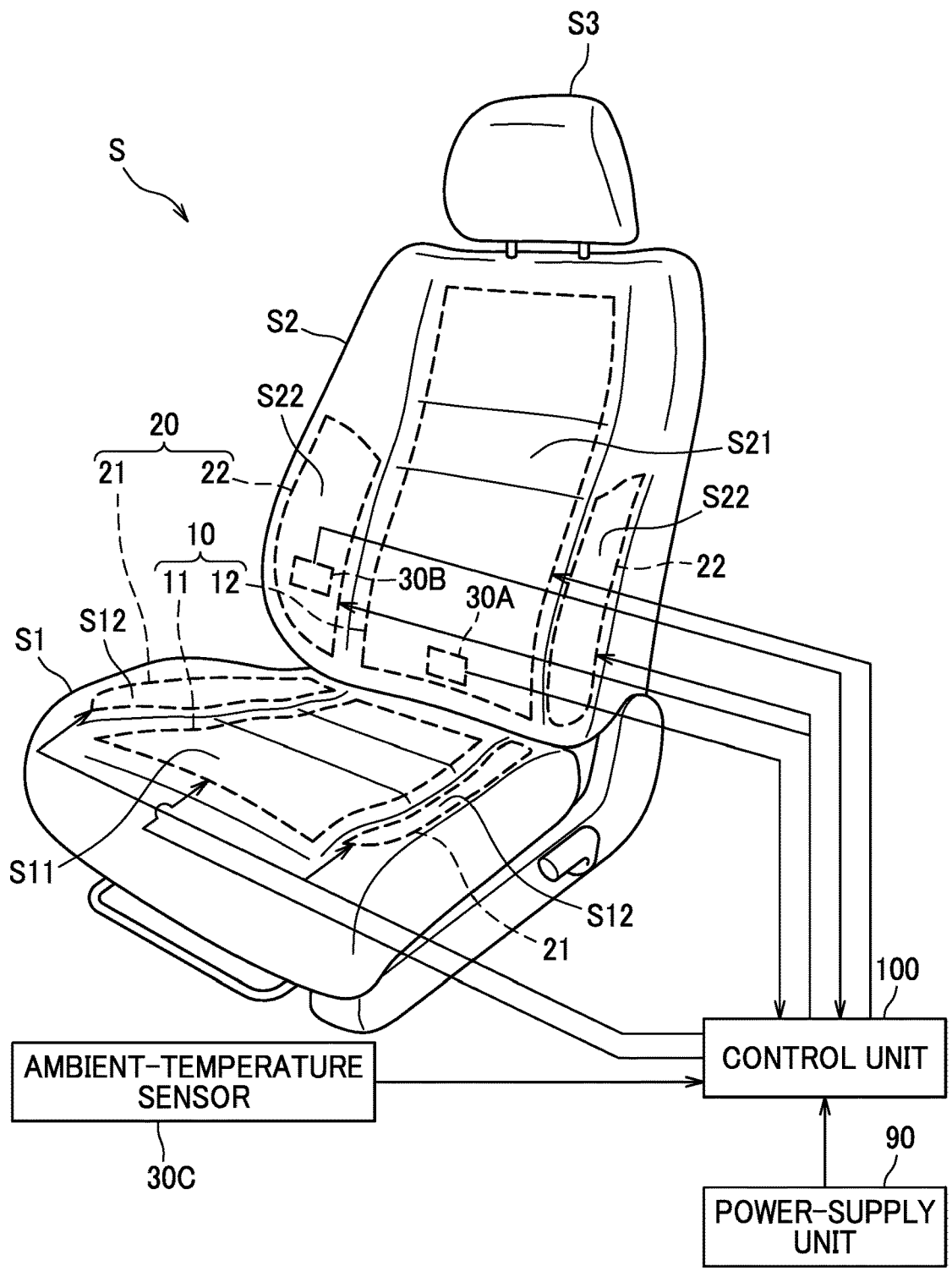
FIG. 6 is a perspective view of a car seat as a seat according to a second embodiment.

Here, as shown in FIG. 4 (*a*) and FIG. 5 (*a*), it takes a longer time for the detected temperature T to reach a first switching temperature T11 after the electric power is supplied to the first heater 10, when the ambient temperature (here, corresponds to the detected temperature T before heating the car seat S) is a first temperature T1 (low ambient temperature) than when the ambient temperature is a second temperature T2 which is higher than the first temperature T1. Consequently, since the electric power supplied to the first heater 10 becomes large and the accumulated electric power consumption W becomes large, and also W1 which is the accumulated electric power consumption when the detected temperature T1 reached the switching temperature T11, the temperature-difference adjustment value A3 becomes larger when the ambient temperature is the first temperature T1 than when the ambient temperature is the second temperature T2. Moreover, as a result, the value 50×A2×A3 also becomes a large value when the ambient temperature is low. Accordingly, in the second stage, if the ambient temperature is low, since 50×A2×A3 which becomes a large value is to be subtracted from the accumulated electric power consumption W, the accumulated electric power consumption W rapidly becomes a value not higher than a predetermined value, and the processing moves rapidly to the third stage.

In the third stage, the control unit 100 executes a temperature-difference adjustment control in which a difference between the temperature of the seating surface portions S11 and S21 and the temperature of the bulging portions S12 and S22 is made larger by controlling the output of the second heater 20 to lower the temperature of the bulging portions S12 and S22 with respect to the temperature of the seating surface portions S11 and S21, when the ambient temperature is the first temperature T1 (low ambient temperature) than when the ambient temperature is the second temperature T2 (high ambient temperature). More specifically, in the present embodiment, the control unit 100, in the temperature-difference adjustment control, controls the first heater 10 by the first required control amount mv1 calculated on the basis of the target temperature T12 and the detected temperature T, and calculates a second required control amount mv2 on the basis of the first required control amount mv1, and controls the heater 20 by the second required control amount mv2. It is possible to calculate the second required control amount mv2 by mv2=mv1/A3.

Here, since the temperature-difference adjustment value A3 becomes larger when the ambient temperature is the first temperature T1 than when the ambient temperature is the second temperature T2, a magnitude mv2/mv1 of the second required control amount mv2 with respect to the first required control amount mv1 becomes smaller when the ambient temperature is the first temperature T1 than when the ambient temperature is the second temperature T2. Consequently, in the third stage, since an amount of heat supplied to the second heater 20 with respect to the amount of heat supplied to the first heater 10 becomes smaller when the ambient temperature is the first temperature T1 than when the ambient temperature is the second temperature T2, the temperature of the bulging portions S12 and S22 with respect to the temperature of the seating surface portions S11 and S21 becomes lower, and the difference in the temperature of the seating surface portion S11 and S21 and the temperature of the bulging portions S12 and S22 becomes larger.

Figure 3:
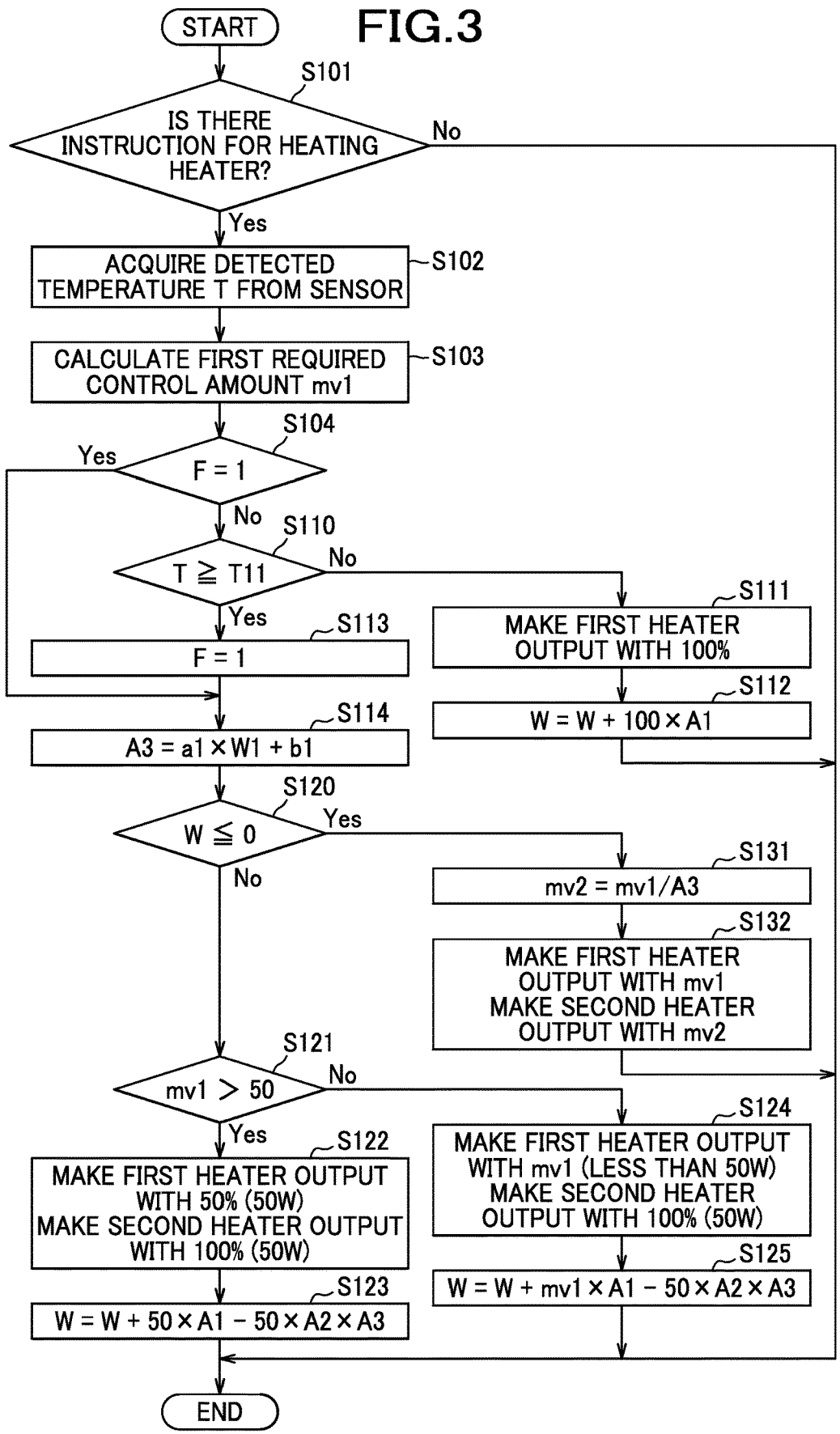
FIG. 3 is a flowchart showing a processing of a control unit in the first embodiment.

A processing of the control unit 100 in the above-described car seat S will be described below with reference to FIG. 3. The control unit 100 repeatedly carries out a processing from a start to an end shown in FIG. 3 for each control cycle.

The control unit 100, to start with, makes a judgment of whether or not an instruction for heating by a heater has been received, and if there is no instruction (No at step S101), terminates the processing.

On the other hand, when there is an instruction for heating by the heater (Yes at step S101), the control unit 100 acquires the detected temperature T from the temperature sensor 30 (step S102), and calculates the first required control amount mv1 (step S103). Moreover, the control unit 100 makes a judgment of whether the flag F is 1, and if the flag F is not 1 (No at step S104), the process advances to step S110, and if the flag F is 1 (Yes at step S104), the process advances to step S114 without making a judgment of whether or not to enter the first stage.

At step S110, the control unit 100 makes a judgment of whether or not the detected temperature T is higher than or equal to the switching temperature T11, and if the detected temperature T is not higher than or equal to the switching temperature T11 (No at step S110), as the first stage, the control unit 100 makes the heater 10 output with 100%, or in other words, 100 W (step S111), and calculates the accumulated electric power consumption W by W=W+100×A1 (step S112), and terminates the processing.

On the other hand, if the detected temperature T is higher than or equal to the switching temperature T11 (Yes at step S110), the control unit 100 sets the flag F to 1 (step S113), and moreover, calculates the temperature-difference adjustment value A3 by A3=a1×W1+b1 (step S114). Furthermore, the control unit 100 makes a judgment of whether or not the accumulated electric power consumption W is lower than or equal to 0 (step S120).

If the accumulated electric power consumption W is not lower than or equal to 0, (No at step S120), the processing being in the second stage, the control unit 100 makes a judgment of whether or not the first required control amount mv1 is larger than 50. If the first required control amount mv1 is larger than 50 which is the upper limit value (Yes at step S121), the control unit 100 makes the first heater 10 output with 50% (50 W), and makes the second heater 20 output with 100% (50 W) (step S122). Moreover, the control unit 100 calculates the accumulated electric power consumption W by W=W+50×A1−50×A2×A3 (step S123), and terminates the processing.

On the other hand, if the first required control amount mv1 is not larger than 50 which is the upper limit value (No at step S121), the control unit 100 makes the first heater 10 output with mv1 (less than 50 W, becomes 100 W×mv1), and makes the second heater 20 output with 100% (50 W) (step S124). Moreover, the control unit 100 calculates the accumulated electric power consumption W by W=W+mv1×A1−50×A2×A3 (step S125), and terminates the processing.

At step S120, if the accumulated electric power consumption W lower than or equal to 0 (Yes at step S120), this being the third stage, the control unit 100 calculates the second required control amount mv2 by mv2=mv1/A3 (step S131), and controls the first heater 10 with the first required control amount mv1, and controls the second heater 20 with the second required control amount mv2 (step S132), and terminates the processing.

When the above-described processing is carried out, as the occupant operates the operation switch and starts heating the car seat S, the output of the first heater 10 and the output of the second heater 20, and the temperature of the seating surface portions S11 and S21 and the temperature of the bulging portions S12 and S22 change as shown in FIGS. 4 (a) and 4 (b) and FIGS. 5 (a) and 5 (b). More specifically, in the first stage till times t11 and t21, the entire 100 W which is the maximum permissible output, is used by the first heater 10, and the temperature of the seating surface portions S11 and S21 is heated as quickly as possible. Accordingly, with a firm contact with the occupant, by warming up a portion from a lumbar region up to a back where the occupant feels the temperature easily, it is possible to give the occupant a comfortable seating feeling. The temperature of the bulging portions S12 and S22 has risen till the times t11 and t21 because the seat is warmed up by receiving heat of the occupant.

Moreover, in the first stage, the accumulated electric power consumption W is obtained by adding the electric power outputted to the first heater 10 as shown in FIG. 4 (c) and FIG. 5 (c).

At the times t11 and t21, as the detected temperature T detected by the temperature sensor 30 reaches the switching temperature T11, the processing shifts to the second stage. In the second stage, as shown in FIG. 4 (b) and FIG. 5 (b), the control unit 100 supplies the electric power with the maximum output 50 W (100%) to the second heater, and supplies the remaining 50 W electric power to the first heater 10. Moreover, at the times t12 and t22, as the detected temperature T nears the target temperature T12, since mv1 becomes 50 or less than 50 as a result of the difference e becoming small, the control unit 100 controls the first heater 10 by the first required control amount mv1 (electric power not more than 50 W) which is a value lower than or equal to 50.

In the second stage (times t11 to t13, and time t21 to t23), the accumulated electric power consumption W goes on becoming smaller by an amount equivalent to the electric power supplied to the second heater 20 as shown in FIG. 4 (c) and FIG. 5 (c).

Moreover, at the times t13 and t23, as the accumulated electric power consumption W becomes less than or equal to 0, the processing shifts to the third stage. In the present embodiment, the accumulated electric power consumption obtained when the detected temperature T has reached the switching temperature T11 is larger and the temperature-difference adjustment value A3 becomes a larger value (see FIG. 2), when the ambient temperature is the first temperature T1 which is low shown in FIG. 4 than when the ambient temperature is the second temperature T2 which is higher than the first temperature T1 shown in FIG. 5. Accordingly, the value (50×A2×A3) to be subtracted from the accumulated electric power consumption W becomes larger, and a reduction gradient of the accumulated electric power consumption W shown at the times t11 to t13 in FIG. 4 (c) has become larger as compared to a reduction gradient shown at the times t21 to t23 in FIG. 5(c). Consequently, when the ambient temperature is the first temperature T1 which is low, the accumulated electric power consumption W decreases more quickly and becomes lower than or equal to 0 more quickly as compared to the case in which the accumulated electric power consumption W has decreased with a gentle reduction gradient as shown in FIG. 5(c) supposedly. Therefore, it is possible to terminate rapidly the second stage of supplying the electric power to the second heater 20 with the maximum output. Moreover, accordingly, before executing the temperature-difference adjustment control in the third stage, it is possible to make the difference in the temperature of the seating surface portions S11 and S21 and the temperature of the bulging portions S12 and S22 larger as compared to the case in which the ambient temperature is the second temperature T.

In the third stage, the control unit 100 controls the first heater 10 by the first required control amount mv1, and controls the second heater 20 by the second required control amount mv2 (=mv1/A3). At this time, when the ambient temperature is the first temperature T1, the temperature-difference adjustment value A3 is larger as compared to the case in which the ambient temperature is the second temperature T2, so that the magnitude mv2/mv1 of the second required control amount mv2 with respect to the first required control amount mv1 becomes small. Accordingly, the proportion of the output of the second heater 20 with respect to the output of the first heater 10 becomes smaller when the ambient temperature is the first temperature T1 shown in FIG. 4(b) than when the ambient temperature is the second temperature T2 shown in FIG. 5(b), and the amount of heat supplied by the second heater 20 with respect to the amount of heat supplied by the first heater 10 becomes smaller. This makes it possible to maintain a state in which the difference in the temperature of the seating surface portions S11 and S21 and the temperature of the bulging portions S12 and S22 is larger when the ambient temperature is the first temperature T1 than when the ambient temperature is the second temperature 2, because the temperature of the bulging portions S12 and S22 with respect to the temperature of the seating surface portions S11 and S21 becomes low.

According to the car seat S as described above in the present embodiment, it is possible to suppress the electric power consumption while providing the comfort. More specifically, it was revealed from the result of the study that, when the ambient temperature is the first temperature T1, even if the difference in the temperature of the seating surface portions S11 and S21 and the temperature of the bulging portions S12 and S22 is made large, the occupant hardly feels the difference in the temperatures. For this reason, it is possible to suppress the electric power consumption without giving discomfort to the occupant, by controlling the output of the second heater 20 to lower the temperature of the bulging portions S12 and S22 with respect to the temperature of the seating surface portions S11 and S21 when the ambient temperature is the first temperature T1 than when the ambient temperature is the second temperature T2. On the other hand, when the ambient temperature is the second temperature T2 which is high, it was revealed that even when the difference in the temperature of the seating surface portions S11 and S21 and the temperature of the bulging portions S12 and S22 is not large, the difference in the temperatures is easily felt by the occupant. In this case, the difference in the temperature of the seating surface portions S11 and S21 and the temperature of the bulging portions S22 becomes smaller as compare to the case in which the ambient temperature is the first temperature T1 which is low, and thus it is possible to secure the comfort.

Moreover, according to the present embodiment, in the temperature-difference adjustment control, the control unit 100 controls the first heater 10 by the first required control amount mv1 calculated on the basis of the detected temperature T and the target temperature T12, then calculates the second required control amount mv2 which becomes a small value when the ambient temperature is low, on the basis of the first required control amount mv1, and controls the second heater 20 by the second required control amount mv2. Therefore, it is possible to control the output of the second heater 20 to lower the temperature of the bulging portions S12 and S22 with respect to the temperature of the seating surface portions S11 and S21, only with temperature sensor 30.

Moreover, the control unit 100 firstly supplies the electric power only to the first heater 10 if the detected temperature T has not reached the switching temperature T11 when the instruction for heating the car seat S has been received, so that it is possible to heat up promptly the seating surface portions S11 and S21 of which the temperature is felt easily by the occupant. This can improve the comfort.

Moreover, according to the present embodiment, the control unit 100 supplies the maximum electric power output to the second heater 20 when the detected temperature T has reached the switching temperature T11. Accordingly, it is possible to bring the temperature of the bulging portions S12 and S22 closer to the temperature of the seating surface portions S11 and S21 by heating promptly the bulging portion S12 and S22 after the seating surface portions S11 and S21 have been heated. This makes it possible to improve the comfort. Furthermore, the control unit 100 subtracts the temperature-difference adjustment value A3 which becomes a large value when the ambient temperature is low, from the accumulated electric power consumption W, and if the accumulated electric power consumption W becomes a value smaller than or equal to a predetermined value, the control unit 100 executes the temperature-difference adjustment control. Accordingly, the accumulated electric power consumption W becomes lower than or equal to 0 more rapidly to execute the temperature-difference adjustment control when the ambient temperature is the first temperature T1 which is low than when the ambient temperature is the second temperature T2 which is high. Accordingly, it is possible to shorten the time for which the second heater 20 operates with the maximum output and to minimize the wasteful heating of the bulging portions S12 and S22 by the second heater 20. This makes it possible to suppress the electric power consumption.

Moreover, since the first heater 10 is provided to the seating surface portions S11 and S21, it is possible to heat by the first heater 10 the seating surface portions S11 and S21 of which the temperature is felt easily by the occupant. This makes it possible to improve the comfort. Moreover, regarding the bulging portions S12 and S22 that is disposed farther from the occupant than the seating surface portions S11 and S21, a temperature difference to certain extent with the seating surface portions S11 and S21 hardly gives any feeling of discomfort to the occupant, so that providing the second heater 20 to the bulging portions S12 and S22 makes it possible to suppress further the electric power consumption by suppressing further the output of the second heater 20.

Second Embodiment

A seat according to the present embodiment is configured as a car seat S to be mounted in a car. This car seat S includes the seat cushion S1, the seat back S2, and the headrest S3. In this embodiment, parts different from those described in the first embodiment will be described in detail, and same reference numerals will be assigned to components which are similar as in the first embodiment, and the description thereof will be omitted.

In the seating surface portion S21 of the seat back S2, a first temperature sensor 30A is built-in in an area corresponding to the first heater 10, at the inner side of the skin, and in the bulging portion S22, a second temperature sensor 30B is built-in in an area corresponding to the second heater 20, at the inner side of the skin. The temperature sensors 30A and 30B, similar to the temperature sensor 30 of the first embodiment, are disposed at positions where there is no effect of the body temperature of the occupant, The first temperature sensor 30A is connected to the control unit 100, to output a signal of a first detected temperature Ta to the control unit, and the second temperature sensor 30B is connected to the control unit 100, to output a signal of a second detected temperature Tb to the control unit 100. Moreover, an ambient-temperature sensor 30 as a third temperature sensor which detects the ambient temperature, or more specifically, a temperature of an interior of vehicle, is connected to the control unit 100. The ambient-temperature sensor 30C outputs a signal of an ambient temperature Tc to the control unit 100. The ambient-temperature sensor 30C may be built-in in the car seat S, similarly as the temperature sensors 30A and 30B, or may be a sensor that has been provided separately in addition to the car seat S, such as a room-temperature sensor provided to a car originally. In other words, the ambient temperature Tc may be acquired from a sensor provided in the car seat S, or may be acquired from a sensor provided outside the car seat S.

The control unit 100 receives an instruction for heating the car seat S from the operation switch, and controls the first heater 10 and the second heater 20. The control unit 100 is configured to execute the first stage of raising promptly the temperature of the seating surface portions S11 and S21 by making the first heater 10 heat intensively upon receiving the instruction for seat heating from the operation switch, the second stage of starting the heating of the second heater 20 and bringing the temperature of the bulging portions S12 and S22 closer to the temperature of the seating surface portions S11 and S21, and the third stage of adjusting the detected temperatures Ta and Tb to target temperatures T12 and T22.

As a standard for switching from the first stage to the second stage, the control unit 100 makes a judgment of whether or not the first detected temperature Ta acquired by the first temperature sensor 30A has reached a first switching temperature T11 which is lower than the target temperature T12. In the first stage in which the first detected temperature Ta has not reached the first switching temperature T11, the control unit 100 supplies the electric power only to the first heater 10, and without supplying the electric power to the second heater 20, controls the first heater 10 with the maximum output.

When the first detected temperature Ta has reached the first switching temperature T11, the control unit 100 sets the flag F to 1 indicating that the first detected temperature Ta has reached the first switching temperature T11.

As a standard for switching from the second stage to the third stage, the control unit 100 makes a judgment of whether or not the second detected temperature Tb acquired by the second temperature sensor 30B has reached a second switching temperature T21 which is lower than the second target temperature T22. In the stage 2 (before executing the temperature-difference adjustment control) in which the second detected temperature Tb has not reached the second switching temperature T21, the control unit 100 supplies the maximum electric power output to the second heater 20. Moreover, in the second stage, the control unit 100 calculates the first required control amount mv1 on the basis of the first target temperature T12 and the first detected temperature Ta, and controls the first heater 10 by the first required control amount mv1. For instance, the first required control amount mv1 can be calculated by $mv1 = Kp \times e + ie/Ki$, as the required control amount of the PI control similarly as in the case of the first embodiment.

When the second detected temperature Tb has reached the second switching temperature T21, the control unit 100 sets the flag F to 2 indicating that the second detected temperature Tb has reached the second switching temperature T21. The initial value of the flag F is 0, and when the operation switch is switched OFF, the flag F is reset to 0.

When the second detected temperature Tb has reached the second switching temperature T21, the control unit 100 terminates the second stage and shifts to the third stage, and then executes the temperature-difference adjustment control.

In the third stage, the control unit 100 executes the temperature-difference adjustment control in which a difference between the temperature of the seating surface portions S11 and S21 and the temperature of the bulging portions S12 and S22 is made larger by controlling the output of the second heater 20 to lower the temperature of the bulging portions S12 and S22 with respect to the temperature of the seating surface portions S11 and S21 when the ambient temperature Tc is the first temperature T1 than when the ambient temperature Tc is the second temperature T2 which is higher than the first temperature T1. More specifically, according to the present embodiment, in the temperature-difference adjustment control, the control unit 100 controls the first heater 10 by the first required control amount mv1 calculated on the basis of the first target temperature T12 and the first detected temperature Ta, and calculates the second required control amount mv2 on the basis of the second target temperature T22 and the second detected temperature Tb, and controls the heater 20 by the second required control amount mv2. The second required control amount mv2 can be calculated as a required control amount of the PI control, similarly as the first required control amount mv1 for example.

Figure 7:
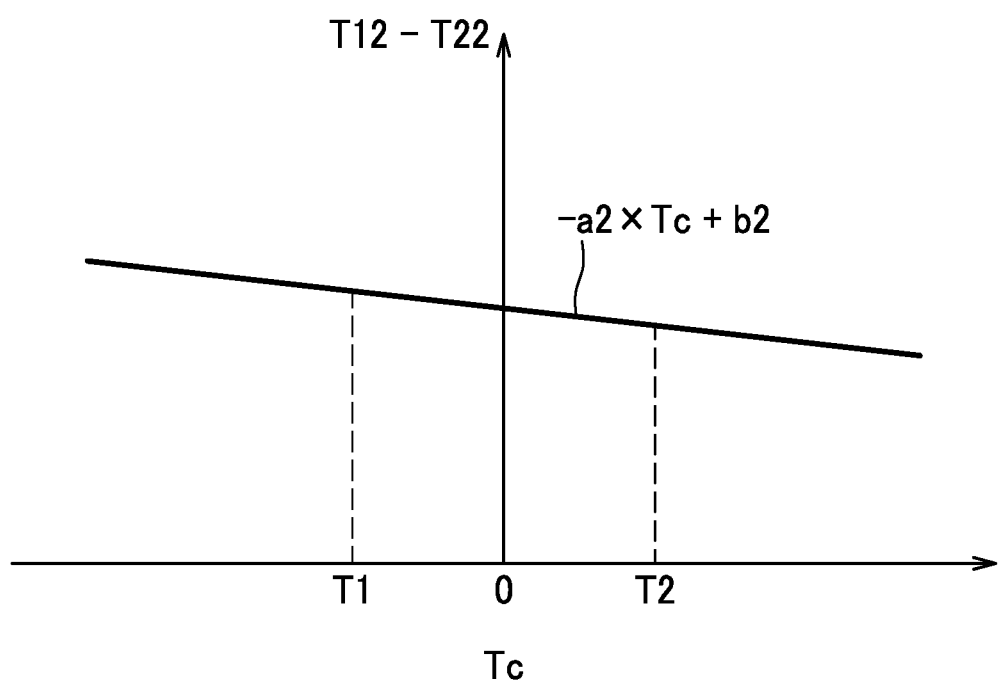
FIG. 7 is a map showing a relationship of the difference between first target temperature and second target temperature, with respect to ambient temperature, in the second embodiment.

The second target temperature T22 can be calculated by $T22 = T12 - (-a2 \times Tc + b2)$, as an example, on the basis of the first target temperature T12 and the ambient temperature Tc. As shown in FIG. 7, a difference (T12−T22) between the first target temperature T12 and the second target temperature T22 is set such that the value becomes larger when the ambient temperature Tc is the first temperature T1 than when the ambient temperature Tc is the second temperature T2 which is higher than the first temperature T1. Consequently, a value $-a2 \times Tc + b2$ becomes larger when the ambient temperature Tc is the first temperature T1 than when the ambient temperature Tc is the second temperature T2, and therefore, the second target temperature T22 calculated by $T12 - (-a2 \times Tc + b2)$ becomes a small value.

Moreover, the second switching temperature T21 as a standard for switching from the second stage to the third stage has been set to be a lower value when the ambient temperature Tc is the first temperature T1 than when the ambient temperature Tc is the second temperature T2. As an example, the second switching temperature T21 can be calculated by $T21 = T22 - Td$. Accordingly, the second switching temperature T21 becomes a low value when the ambient temperature Tc is low and the second target temperature T22 becomes a small value, and becomes a high value when the ambient temperature Tc is high and the second target temperature T22 becomes a large value. Here, Td may be a constant or may be a variable.

Figure 8:
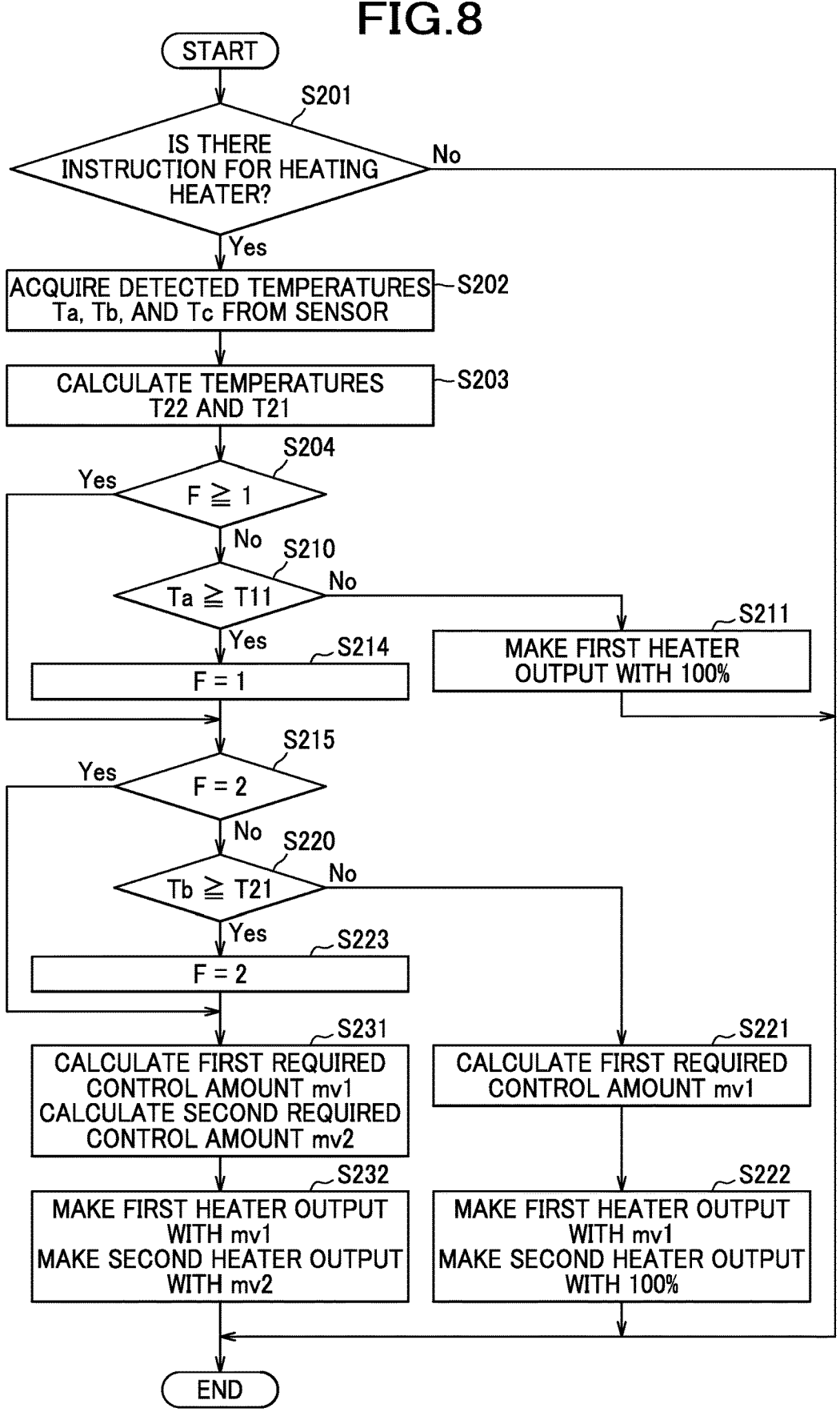
FIG. 8 is a flowchart showing a processing of the control unit in the second embodiment.

A processing of the control unit 100 in the above-described car seat S will be described below with reference to FIG. 8. The control unit 100 repeatedly carries out a processing from a start to an end shown in FIG. 8 for each control cycle.

The control unit 100, to start with, makes a judgment of whether or not an instruction for heating by a heater has been received, and terminates the processing if it receives no instruction (No at step S201).

On the other hand, if there is an instruction for heating by the heater (Yes at step S201), the control unit 100 acquires the detected temperatures Ta, Tb, and Tc from the temperature sensors 30A, 30B, and 30C (step S202), and calculates each of the second target temperature T22 and the second switching temperature T21 (step S203). Moreover, the control unit 100 makes a judgment of whether the Flag F is 1 or higher than 1 (1 or 2), and if the flag F is not 1 or higher than 1 (i.e., the flag F is 0) (No at step S204), the processing advances to step S210, and if the flag F is 1 or higher than 1 (Yes at step S204), the processing advances to step S215.

At step S210, the control unit 100 makes a judgment of whether or not the first detected temperature Ta of the first temperature sensor 30A is not lower than the first switching temperature T11, and if the first detected temperature Ta is lower than the first switching temperature T11 (No at step S210), being the first stage, the control unit 100 makes the first heater 10 output with 100% (step S211), and terminates the processing.

On the other hand, if the first detected temperature Ta is higher than or equal to the first switching temperature T11 (Yes at step S210), the control unit 100 sets the flag F to 1 (step S214). Moreover, the control unit 100 makes a judgment of whether the flag F is 2, and if the flag F is not 2 (No at step S215), the processing advances to step S220, and if the flag F is 2 (Yes at step S215), the processing advances to step S231.

At step S220, the control unit 100 makes a judgment of whether or not the second detected temperature Tb of the second temperature sensor 30B is higher than or equal to the second switching temperature T21, and if the second detected temperature Tb is not higher than or equal to the second switching temperature T21 (No at step S220), being the second stage, the control unit 100 calculates the first required control amount mv1 (step S221), and makes the first heater 10 output with mv1, and makes the second heater 20 output with 100% (step S22), and terminates the processing.

On the other hand, if the second detected temperature Tb is higher than or equal to the second switching temperature T21 (Yes at step S220), the control unit 100 sets the flag F to 2 (step S223). Moreover, being the third stage, the control unit 100 calculates each of the first required control amount mv1 and the second required control amount mv2 (step S231), and makes the first heater 10 output with mv1 and the second heater 20 output with mv2 (step S232), and terminates the processing.

According to the processing as described above, when the occupant operates the operation switch and starts heating the car seat S, the control unit 100, in the first stage from a time t31 up to a time t41, supplies the maximum electric power output to the first heater 10, and heats up the temperature of the seating surface portions S11 and S21 promptly. Moreover, at the times t31 and t41, if the first detected temperature Ta detected by the first temperature sensor 30A reaches the first switching temperature T11, the processing shifts to the second stage.

Figure 9:
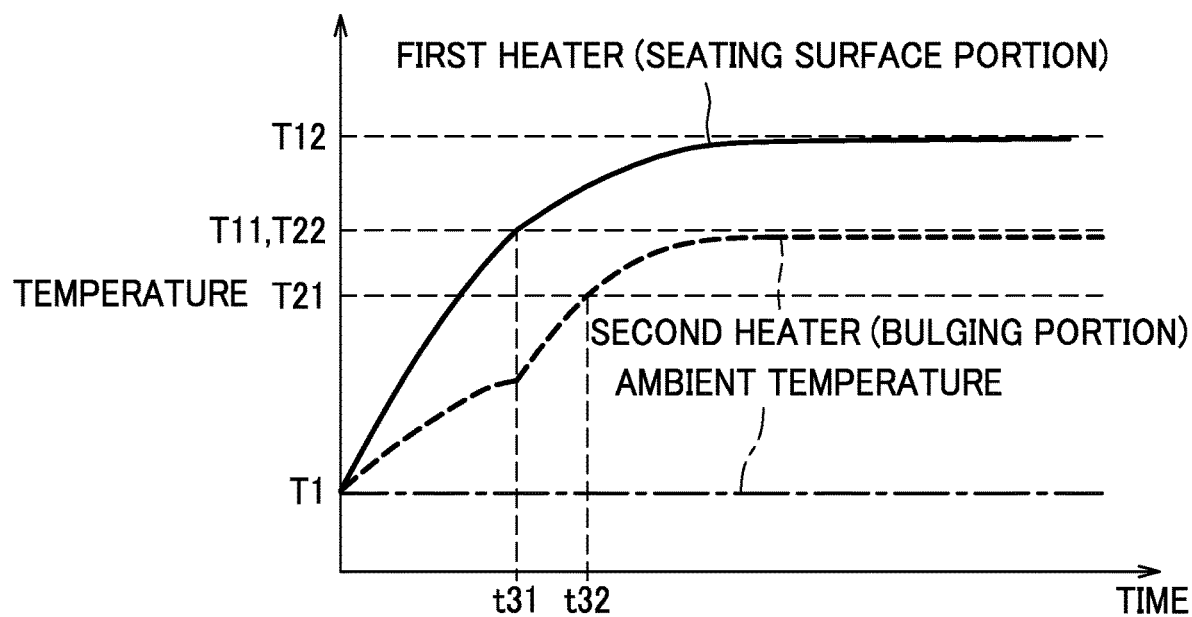
FIG. 9 includes a graph (a) showing a change in temperature of a seating surface portion and a bulging portion when the ambient temperature is a first temperature, and a graph (b) showing a change in temperature of the seating surface portion and the bulging portion when the ambient temperature is a second temperature which is higher than the first temperature, in the second embodiment.
Figure 9:
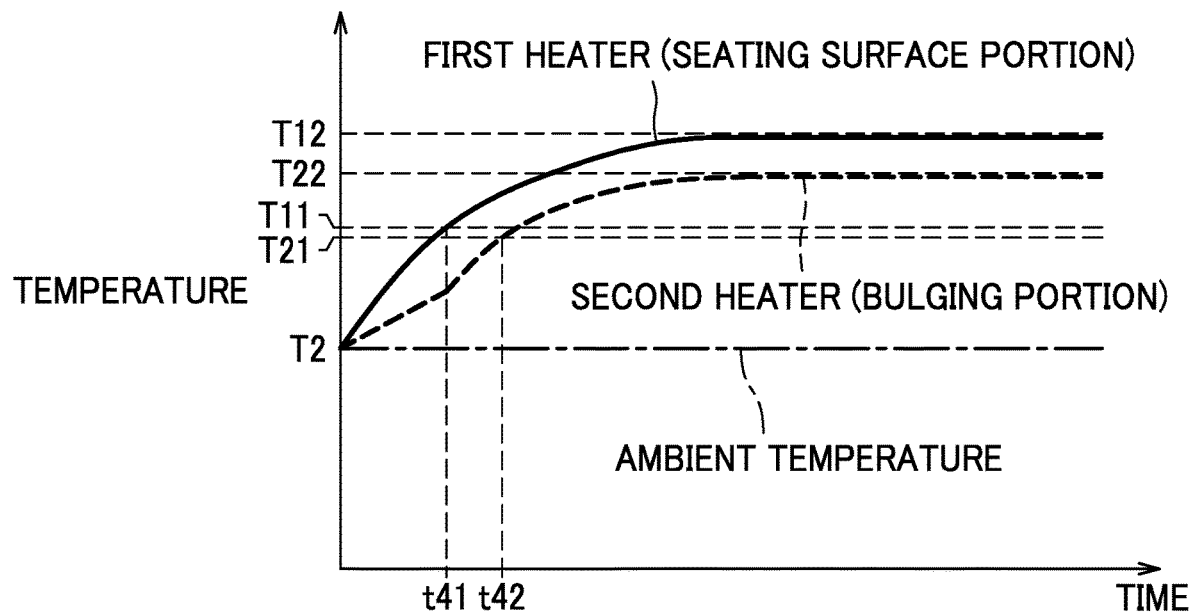

In the second stage, the control unit 100 supplies the maximum electric power output to the second heater 20, and control the first heater 10 by the first required control amount mv1. Moreover, at times t32 and t42, if the second detected temperature Tb detected by the second sensor 30B reaches the second switching temperature T21, the processing shifts to the third stage. According to the present embodiment, the second switching temperature T21 is lower when the ambient temperature Tc is the first temperature T1 which is low as shown in FIG. 9 (a) than when the ambient temperature Tc is the second temperature T2 which is higher than the first temperature T1 as shown in FIG. 9 (b). Accordingly, the second detected temperature Tb reaches the second switching temperature T21 rapidly, and it is possible to terminate rapidly the second stage of supplying the maximum electric power output to the second heater 20. This makes it possible, before executing the temperature-difference adjustment control in the third stage, to make the difference between the temperature of the seating surface portions S11 and S21 and the temperature of the bulging portions S12 and S22 larger as compared to the case in which the ambient temperature Tc is the second temperature T2.

In the third stage, the control unit 100 controls the first heater 10 by the first required control amount mv1 and controls the second heater 20 by the second required control amount mv2. At this time, the difference in the first target temperature T12 and the second target temperature T22 becomes larger, more specifically, the second target temperature T22 becomes smaller with respect to the first target temperature T12 when the ambient temperature Tc is the first temperature T1 than when the ambient temperature Tc is the second temperature T2. Consequently, since the magnitude mv2/mv1 of the second required control amount mv2 with respect to the first required control amount mv1 becomes small, an amount of heat supplied to the second heater 20 with respect to an amount of heat supplied to the first heater 10 becomes smaller. Accordingly, since the temperature of the bulging portions S12 and S22 with respect to the temperature of the seating surface portions S11 and S21 becomes lower, the difference in the temperature of the seating surface portions S11 and S21 and the temperature of the bulging portions S12 and S22 can be maintained to be larger when the ambient temperature Tc is the first temperature T1 than when the ambient temperature Tc is the second temperature T2.

According to the car seat S as described above in the present embodiment, the electric power consumption can be suppressed while providing the comfort similarly as in the first embodiment.

Moreover, according to the present embodiment, in the temperature-difference adjustment control, the control unit 100 controls the first heater 10 by the first required control amount mv1 calculated on the basis of the first target temperature T12 and the first detected temperature Ta, and controls the second heater 20 by the second required control amount mv2 that is calculated on the basis of the second target temperature T22 which differs to a large extent from the first target temperature T12 when the ambient temperature Tc is low, and the second detected temperature Tb. Accordingly, it is possible to control the output of the second heater 20 to lower the temperature of the bulging portions S12 and S22 with respect to the temperature of the seating surface portions S11 and S21. Moreover, the first temperature sensor 30A for acquiring the first detected temperature Ta is provided in an area corresponding to the first heater 10 and the second temperature sensor 30B for acquiring the second detected temperature Tb is provide in an area corresponding to the second heater 20, so that the accuracy of temperature control can be improved by the two temperature sensors 30A and 30B to improve the comfort.

Moreover, in the present embodiment, before executing the temperature-difference adjustment control, the control unit 100 supplies the maximum electric power output to the second heater 20 when the second detected temperature Tb has not reached the second switching temperature T21. This can heat the bulging portions S12 and S22 promptly, and bring the temperature of the bulging portions S12 and S22 closer to the temperature of the seating surface portions S11 and S21 promptly, to improve the comfort.

Moreover, in the present embodiment, the control unit 100 executes the temperature-difference adjustment control when the second detected temperature Tb has reached the second switching temperature T21 which assumes a low value if the ambient temperature Tc is low. Therefore, the second detected temperature Tb reaches the second switching temperature T21 faster when the ambient temperature Tc is the first temperature T1 (lower ambient temperature) than when the ambient temperature Tc is the second temperature T2 (higher ambient temperature), and the temperature-difference adjustment control can be executed quickly. Accordingly, the time for which the second heater 20 operates with the maximum output is shortened, and the bulging portions S12 and S22 are not heated wastefully by the second heater 20, so that the electric power consumption can be suppressed.

Moreover, the control unit 100 supplies the electric power only to the first heater 10 when the first detected temperature Ta has not reached the first switching temperature T11 upon receiving the instruction for heating the car seat S. This makes it possible to firstly heat the seating surface portions S11 and S21 promptly of which the temperature is felt easily by the occupant, and to improve the comfort.

Although various embodiments of the present invention have been described above, the present invention is not limited to these embodiments, and changes or modifications may be made to the structure thereof where appropriate.

For instance, in the first embodiment, although the second required control amount mv2 is calculated by multiplying the first required control amount mv1 by a reciprocal of the temperature-difference adjustment value A3, the method of calculation is not limited to this specific calculation. The second required control amount, for example, may be calculated from a map or a formula indicating a relationship of the first required control amount and the second required control amount that is set in advance on the basis of the results of the heating test.

Moreover, assuming that the ambient temperature varies with the elapsing of time, the temperature-difference adjustment value A3 may be varied on the basis of the ambient temperature, and the output of the second heater in the third stage may be changed according to the ambient temperature. For example, when the ambient temperature becomes high, the time till the detected temperature T becomes higher than or equal to the switching temperature T11 becomes short. Accordingly, the temperature-difference adjustment value A3 may be varied as a function of time on the basis of this time. Moreover, the ambient temperature may be detected, and the temperature-difference adjustment value A3 may be varied as a function of the ambient temperature, on the basis of the ambient temperature detected.

In the above-described embodiments, although the first heater 10 is provided to the seating surface portions S11 and S21, and the second heater 20 is provided to the bulging portions S12 and S22, the arrangement of the first heater and the second heater is not limited to this specific arrangement. For example, the first heater may be provided to the seat cushion and the second heater may be provided to the seat back. Moreover, both of the first heater and the second heater may be provided to the seating surface portions, or may be provided to the bulging portions.

In the above-described embodiments, although an independent type seat that is to be used for a driver's seat and a front passenger seat of an automobile has been exemplified as the car seat S, the seat is not limited to this specific type, and may be a bench type seat that is commonly used for a backseat of an automobile. Moreover, in the above-described embodiments, although the car seat S that is mounted in a car has been exemplified as a seat, the seat may be a vehicle seat to be mounted in a railway car, a marine vessel, and an aircraft. Furthermore, the seat is not limited to a vehicle seat, and may be a seat used in a house for example.

In the above-described embodiments, although the seat has a configuration such that the electric power is supplied from the power-supply unit 90 that is driven by the battery mounted in the vehicle, the present invention is not limited to this specific configuration. For instance, the battery may be mounted in the seat. Further, if the seat is a seat intended for home use, the electric power may be supplied from a commercial power supply.

A seat according to a third embodiment and a seat according to a fourth embodiment of the present invention will be described below with reference to FIG. 10 to FIG. 15.

The seat according to the third embodiment and the seat according to the fourth embodiment are seats in which the electric power consumption of a plurality of heaters is adjusted according to the physique of the occupant. The seat according to the third embodiment and the seat according to the fourth embodiment may be used in combination with the above-described seat according to the first embodiment or the seat according to the second embodiment.

Third Embodiment

Figure 10:
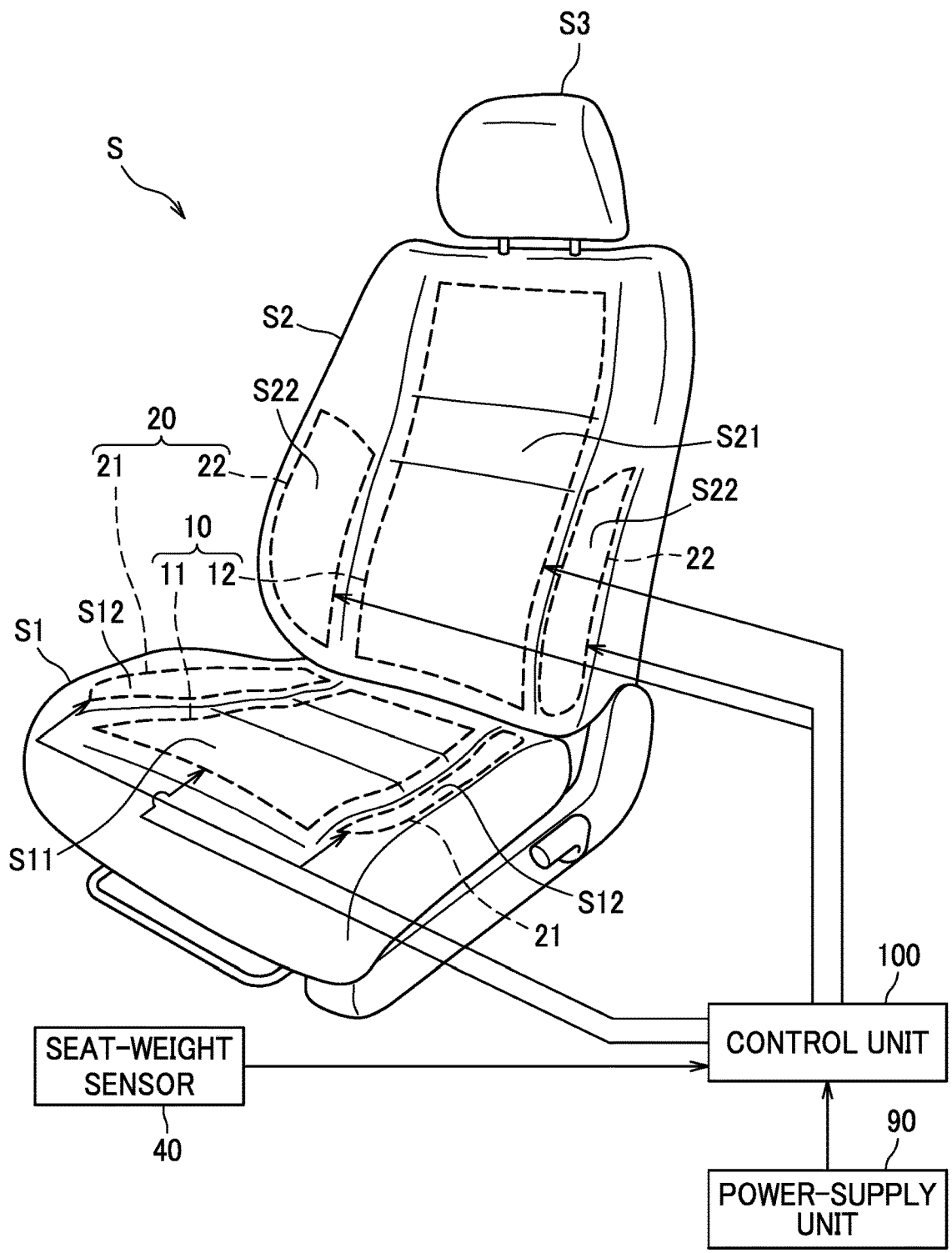
FIG. 10 is a perspective view of a car seat as a seat according to a third embodiment.

As shown in FIG. 10, a seat according to the present embodiment is configured as a car seat S mounted in a car. This car seat S includes the seat cushion S1, the seat back S2, and the headrest S3; the seat cushion S1 is formed by upholstering a pad material made of a cushion material such as urethane foam with a skin material such as synthetic leather and cloth. Further, the car seat S includes a main heater 10 as a first heater, a sub-heater 20 as a second heater, a seat-weight sensor 40 as an example of a physique detecting unit, and the control unit 100.

The seat cushion S1 includes the seating surface portion S11 which is disposed at a horizontal center, and which supports the hips and thighs of the occupant from below by making a contact, and the bulging portion S12 which is disposed on each of left and right outer sides of the seating surface portion S11, and which is jutted out toward the occupant for supporting the side portions of the thighs and hips of the occupant. The seat back S2 also includes the seating surface portion S21 which is disposed at a horizontal center, and which supports the back of the occupant from behind by making a contact with the back, and the bulging portion S22 which is disposed on each of left and right outer sides of the seating surface portion S21, and which is jutted out toward the occupant for supporting the side portions of the upper body of the occupant.

The main heater 10 is a heater in the form of a sheet provided to the seating surface portions S11 and S21 of the car seat S, and includes a cushion main-heater (center heater) 11 and a back main-heater (center heater) 12. The cushion main-heater 11 is disposed between the pad material and the skin material of the seating surface portion S11 of the seat cushion S1, and the back main-heater 12 is disposed between the pad material and the skin material of the seating surface portion S21 of the seat back S2.

The sub-heater 20 is a heater in the form of a sheet provided to the bulging portions S12 and S22 of the car seat S, and includes a cushion sub-heater (side heater) 21 and a back sub-heater (side heater) 22. The cushion sub-heater 21 is disposed between the pad material and the skin material of the bulging portion S12 provided on the left and right outer sides of the seating surface portion S11, and the back sub-heater 22 is disposed between the pad material and the skin material of the bulging portion S22 provided on the left and right outer sides of the seating surface portion S21. Moreover, the cushion sub-heater 21 is disposed on the left and right outer sides of the cushion main-heater 11, and the back sub-heater 22 is disposed on the left and right outer sides of the back main-heater 12.

By this arrangement of the heaters 10 and 20, in the present embodiment, the cushion sub-heater 21 is disposed at a position farther from the seating surface portion S11 of the seat cushion S1, than the cushion main-heater 11, and the back sub-heater 22 is disposed at a position farther from the seating surface portion S21 of the seat back S2, than the back main-heater 12. Moreover, the back sub-heater 22 is disposed at a position farther from the seating surface portion S11 of the seat cushion S1, than the back main-heater 12.

The cushion main heater 11 and the back main-heater 12 which constitute the main heater 10, and the left and right cushion sub-heaters 21 and the left and right back sub-heaters 22 which constitute the sub-heater 20 are respectively connected to the control unit 100.

The seat-weight sensor 40 is a sensor which detects the physique of the occupant sitting in the car seat S, more specifically, a weight (body weight) of the occupant. The seat-weight sensor 40 is disposed under the seat cushion S1. The seat-weight sensor 40 is connected to the control unit 100 to output a signal of the weight (hereinafter, referred to as "occupant's weight") WT of the occupant to the control unit 100.

The control unit 100 is a unit which controls an output of the main heater 10 and an output of the sub-heater 20, and is disposed at an appropriate position of the car seat S. The control unit 100 may be disposed outside the car seat S. The control unit 100 is configured such that the electric power is supplied from the power-supply unit 90 which is driven by the battery mounted in the vehicle, and controls the output of the main heater 10 and the output of the sub-heater 20 by the electric power supplied.

The operation switch (not shown) provided to the vehicle is connected to the control unit 100. Upon receiving an instruction for heating with the heaters from the operation switch, the control unit 100 controls the output of the main heater 10 and the output of the sub-heater 20 on the basis of information of the physique of the occupant detected by the seat-weight sensor 40, or in other words, the occupant's weight WT. More specifically, the control unit 100 makes at least a part of the output of the sub-heater 20 smaller when the occupant's weight WT is smaller than a standard than when the occupant's weight WT is more than or equal to the standard.

To be more specific, as shown in FIG. 11, the control unit 100 puts all the heaters, more specifically, the main heater 10 (the cushion main-heater 11 and the back main-heater 12), the left and right cushion sub-heaters 21, and the left and right back sub-heaters 22 in an ON state of supplying the electric power, if the occupant's weight WT is more than or equal to a second weight threshold value WT2 as an example of a first standard. This causes all the heaters to generate heat.

Further, the control unit 100 puts the main heater 10 and the left and right cushion sub-heaters 21 in the ON state in which the electric power is supplied, and on the other hand, puts the left and right back sub-heater 22 in an OFF state in which the electric power is not supplied, if the occupant's weight WT is smaller than the second weight threshold value WT2, and is more than or equal to a first weight threshold value WT1 as an example of a second standard which is smaller than the second weight threshold value WT2. Accordingly, the main heater 10 and the left and right cushion sub heaters 21 generate heat. In other words, if the occupant's weight WT is smaller than the second weight threshold value WT2 as the first standard, the control unit 100 stops the electric power supply (lets the output to be 0) to the back sub-heater 22, and reduces a partial output of the sub heater 20.

Further, the control unit 100 puts the main heater 10 in the ON state in which the electric power is supplied, and on the other hand, puts the left and right cushion sub-heaters 21 and the left and right back sub-heaters 22 in the OFF state in which the electric power is not supplied, if the occupant's weight WT is smaller than the first weight threshold value WT1, and more than or equal to a seating judgment threshold value WT0. Accordingly, the main heater 10 produces heat. In other words, if the occupant's weight WT is smaller than the first weight threshold value WT1 as the second standard, the control unit 100 stops the electric power supply to the back sub-heater 22 and the cushion sub-heater 21 (lets the output to be 0), and reduces the output of the overall sub-heater 20.

If the occupant's weight WT is smaller than the seating judgment threshold value WT0, the control unit 100 puts all the heaters in the OFF state in which no electric power is supplied. Accordingly, the heaters do not generate heat even when the operation switch is operated.

The second weight threshold value WT2 can be set in consideration of a body weight of an occupant who has a physique such that his/her body contacts all the heaters including the cushion main-heater 11, the back main-heater 12, the left and right cushion sub-heaters 21, and the left and right back sub-heaters 22, when he/she sits in the car seat S. Further, the first weight threshold value WT1 can be set in consideration of a body weight of an occupant who has a physique such that his/her body mainly contacts only with the cushion main-heater 11 and the back main-heater 12, when he/she sits in the car seat S.

The seating judgment threshold value WT0 can be set appropriately as a value smaller than the first weight threshold value WT1. For example, the seating judgment threshold value WT0 can be set as a weight for making a judgment that an occupant is not sitting in the car seat S or alternatively as a weight such that when an infant sits in the car seat S, the heater does not operate.

A processing of the control unit 100 in the car seat S as described above will be described below with reference to FIG. 12.

Figure 12:
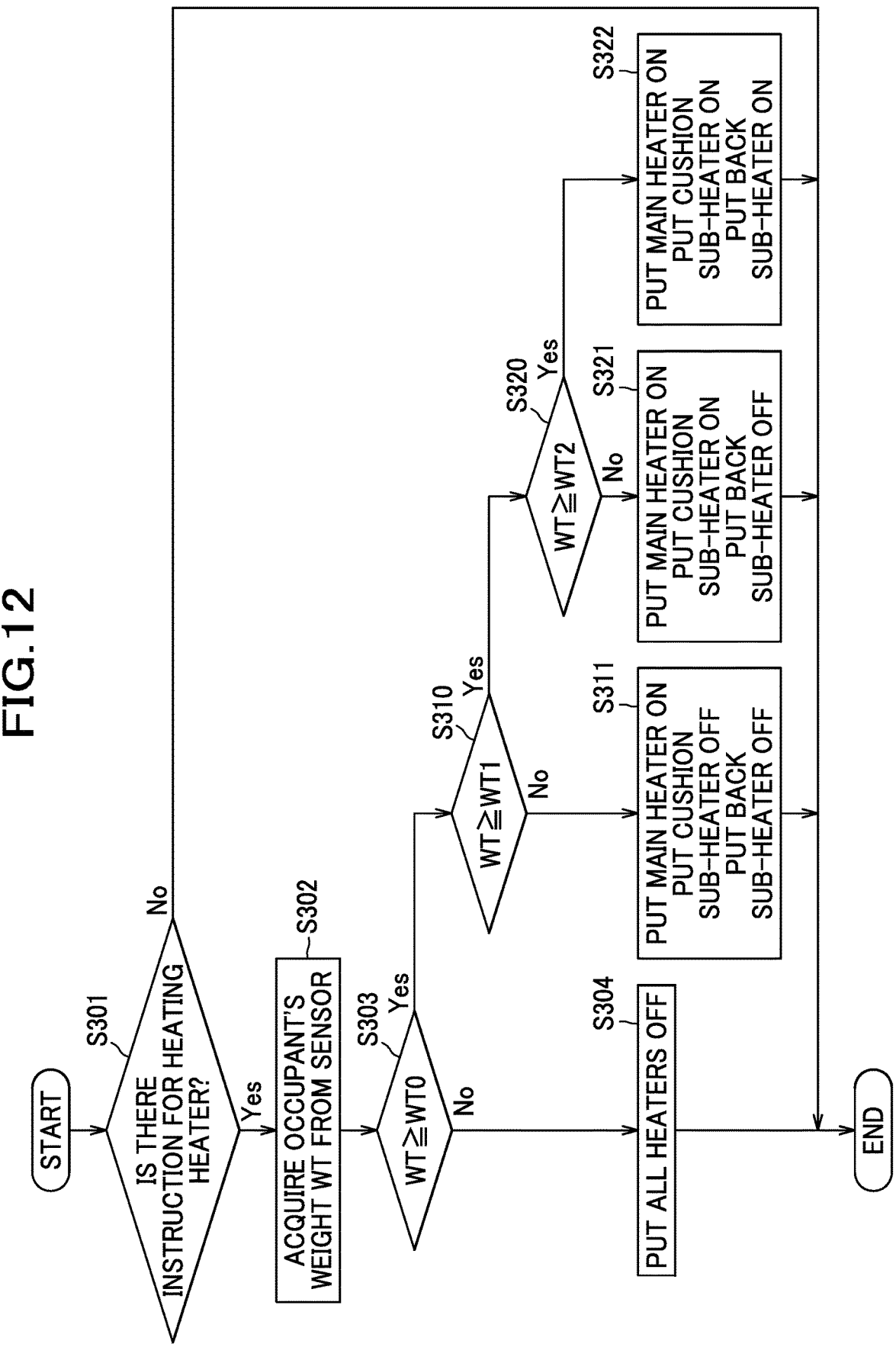
FIG. 12 is a flowchart showing a processing of the control unit in the third embodiment.

The control unit 100 repeatedly carries out a processing from a start to an end shown in FIG. 12 for each control cycle.

The control unit 100, to start with, makes a judgment of whether or not an instruction for heating by a heater has been received (step S301). If there is no instruction for heating (No at step S301), the control unit 100 terminates the processing. On the other hand, if there is an instruction for heating (Yes at step S301), the control unit 100 acquires the occupant's weight WT from the seat-weight sensor 40 (step S302), and makes a judgment of whether or not the occupant's weight WT is more than or equal to the seating judgment threshold value WT0 (step S303).

If the occupant's weight WT is smaller than the seating judgment threshold value WT0 (No at step S303), the control unit 100 puts all the heaters in the OFF state (step S304), and terminates the processing.

If the occupant's weight WT is not smaller than the seating judgment threshold value WT0 (Yes at step S303), the control unit 100 makes a judgment of whether or not the occupant's weight WT is more than or equal to the first weight threshold value WT1 (step S310).

If the occupant's weight WT is smaller than the first weight threshold value (No at step S310), the control unit 100 puts the main heater 10 in the ON state, and puts the sub-heater 20 (cushion sub-heater 21 and the back sub-heater 22) in the OFF state (step S311), and terminates the processing.

If the occupant's weight WT is more than or equal to the first weight threshold value WT1 (Yes at step S310), the control unit 100 makes a judgment of whether or not the occupant's weight WT is more than or equal to the second weight threshold value WT2 (step S320).

If the occupant's weight WT is smaller than the second weight threshold value WT2 (No at step S320), the control unit 100 puts the main heater 10 and the cushion sub-heater 21 in the ON state, and puts the back sub-heater 22 in the OFF state (step S321), and terminates the processing.

If the occupant's weight WT is more than or equal to the second weight threshold value WT2 (Yes at step S320), the control unit 100 puts the main heater 10 and the sub-hear 20 (cushion sub-heater 21 and the back sub-heater 22) in the ON state (step S322), and terminates the processing.

According to the car seat S as described above in the present embodiment, at least a part of the sub-heater 20 disposed at the position farther from the seating surface portion S11 of the seat cushion S1, than the main heater 10 does not contact the occupant when an occupant with a small body frame sits on the seat cushion S1. Therefore, it does not contribute much to the comfort of the occupant, even if the sub-heater 20 is made to generate heat. Accordingly, if the body frame of the occupant (occupant's weight WT) is smaller than the standard, at least a partial output of the sub-heater 20 is made lower, so that a wasteful heat generation by the heater portion not in contact with the occupant is suppressed. This can reduce the electric power consumption in the car seat S.

Moreover, in the present embodiment, if the occupant's weight WT is smaller than the standard, since the electric power supply to at least a part of the sub-heater 20 is stopped, the electric power supply to a heater portion not in contact with the occupant is ceased, and the output thereof becomes 0. Accordingly, the electric power consumption in the car seat S can be made smaller as compared to the case in which the output of at least a part of the sub-heater 20 is halved for example.

Moreover, in the present embodiment, if the occupant's weight WT is smaller than the second weight threshold value WT2, the electric power supply to the back sub-heater 22 is ceased, and if the body frame of the occupant is further smaller (i.e., the occupant's weight WT is smaller than the first weight threshold value WT1), the electric power supply to the back sub-heater 22 and the cushion sub-heater 21 is ceased. Accordingly, the electric power consumption can be reduced further while maintaining the comfort in accordance with the physique of the occupant.

Moreover, the main heater 10 is provided to the seating surface portions S11 and S21, and the sub-heater 20 is provided to the bulging portions S12 and S22. With this configuration, on the one hand, the seating surface portions S11 and S21 of which the temperature is felt easily by the occupant can be heated by the main heater 10 to maintain the comfort. On the other hand, the left and right bulging portions S12 and S22 can be heated by the sub heater 20 in accordance with the physique of the occupant to reduce the electric power consumption.

Fourth Embodiment

Figure 13:
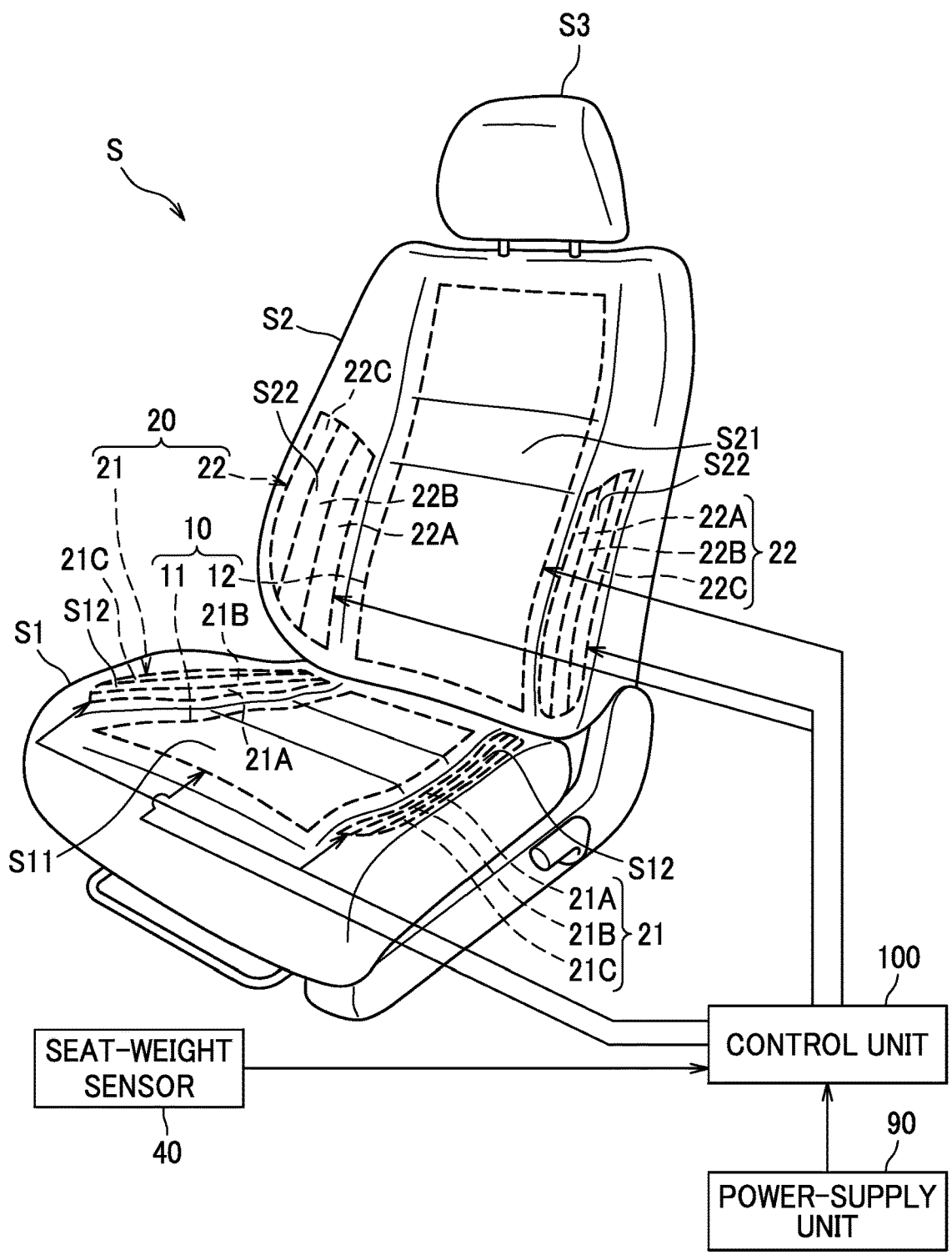
FIG. 13 is a perspective view of a car seat as a seat according to a fourth embodiment.

As shown in FIG. 13, a seat according to the present embodiment is configured as a car seat S mounted in a car, and includes the seat cushion S1, the seat back S2, and the headrest S3. Further, the car seat S includes the main heater 10, the sub-heater 20, the seat-weight sensor 40, and the control unit 100. In this embodiment, parts different from those described in the third embodiment will be described in detail, and same reference numerals will be assigned to components which are similar as in the third embodiment, and the description thereof will be omitted.

The cushion sub-heater 21 and the back sub-heater 22 include a plurality of heater portions that are controllable individually. More specifically, the cushion sub-heater 21 includes a first heater portion 21A, a second heater portion 21B, and a third heater portion 21C, and the back sub-heater 22 includes a first heater portion 22A, a second heater portion 22B, and a third heater portion 22C.

The first heater portion 21A is disposed one each on both left side and right side of the cushion main-heater 11, the second heater portion 21B is disposed one each on left and right outer sides of each first heater portion 21A, and the third heater portion 21C is disposed one each on left and right outer sides of each second heater portion 21B. Similarly, the first heater portion 22A is disposed one each on both left side and right side of the back main-heater 12, the second heater portion 22B is disposed one each on left and right outer sides of each first heater portion 22A, and the third heater portion 22C is disposed one each on left and right outer sides of each second heater portion 22B. In other words, the first heater portion 21A, the second heater portion 21B, and the third heater portion 21C, and the first heater portion 22A, the second heater portion 22B, and the third heater portion 22C are disposed side-by-side in order from an inner side toward an outer side in a leftward-rightward direction.

By this arrangement, in the present embodiment, the second heater portion 21B is disposed at a position farther from the seating surface portion S11 of the seat cushion S1, than the first heater portion 21A, and the third heater portion 21C is disposed at a position farther from the seating surface portion S11, than the second heater portion 21B. Moreover, the second heater portion 22B is disposed at a position farther from the seating surface portion S21 of the seat back S2, than the first heater portion 22A, and the third heater portion 22C is disposed at a position farther from the seating surface portion S21, than the second heater portion 22B. Furthermore, the second heater portion 22B is disposed at a position farther from the seating surface portion S11 of the seat cushion S1, than the first heater portion 22A, and the third heater portion 22C is disposed at a position farther from the seating surface portion S11, than the second heater portion 22B.

Each of the first heater portion 21A, the second heater portion 21B, and the third heater portion 21C of the cushion sub-heater 21, and the first heater portion 22A, the second heater portion 22B, and the third heater portion 22C of the back sub-heater 22 is connected to the control unit 100.

Upon receiving an instruction for heating with the heater from the operation switch (not shown), the control unit 100 controls the output of the main heater 10 and the output of the sub-heater 20 on the basis of the occupant's weight WT. More specifically, if the occupant's weight WT is smaller than the standard, the control unit 100 makes the output smaller in order of the heater portion disposed farthest from the seating surface portion S11 from among the plurality of heater portions of the sub-heater 20, or in order of the first heater portions 21A and 22A, the second heater portions 21B and 22B, and the third heater portions 21C and 22C.

More specifically, the control unit 100 calculates a required control amount mcv for each heater from the occupant's weight WT, and makes each heater output with the required control amount mcv calculated. To be more specific, the control unit 100 calculates each of a required control amount mcv1 for the main heater 10 (the cushion main-heater 11 and the back main-heater 12), a required control amount mcv2 for the first heater portions 21A and 22A, a required control amount mcv3 for the second heater portions 21B and 22B, and a required control amount mcv4 for the third heater portions 21C and 22C, and makes the main heater 10, the first heater portions 21A and 22A, the second heater portions 21B and 22B, and the third heater portions 21C and 22C output with the required control amounts mcv1, mcv2, mcv3, and mcv4 respectively.

Each of the required control amounts mcv1, mcv2, mcv3, and mcv4 can be calculated by the following expressions (1) to (4) as an example.

$$mcv1 = WT \times a1 + b1 \quad (1)$$

$$mcv2 = WT \times a2 + b2 \quad (2)$$

$$mcv3 = WT \times a3 + b3 \quad (3)$$

$$mcv4 = WT \times a4 + b4 \quad (4)$$

In expressions (1) to (4), gradients a1 to a4, and intercepts b1 to b4 have been set in advance by experiment and simulation.

Figure 14:
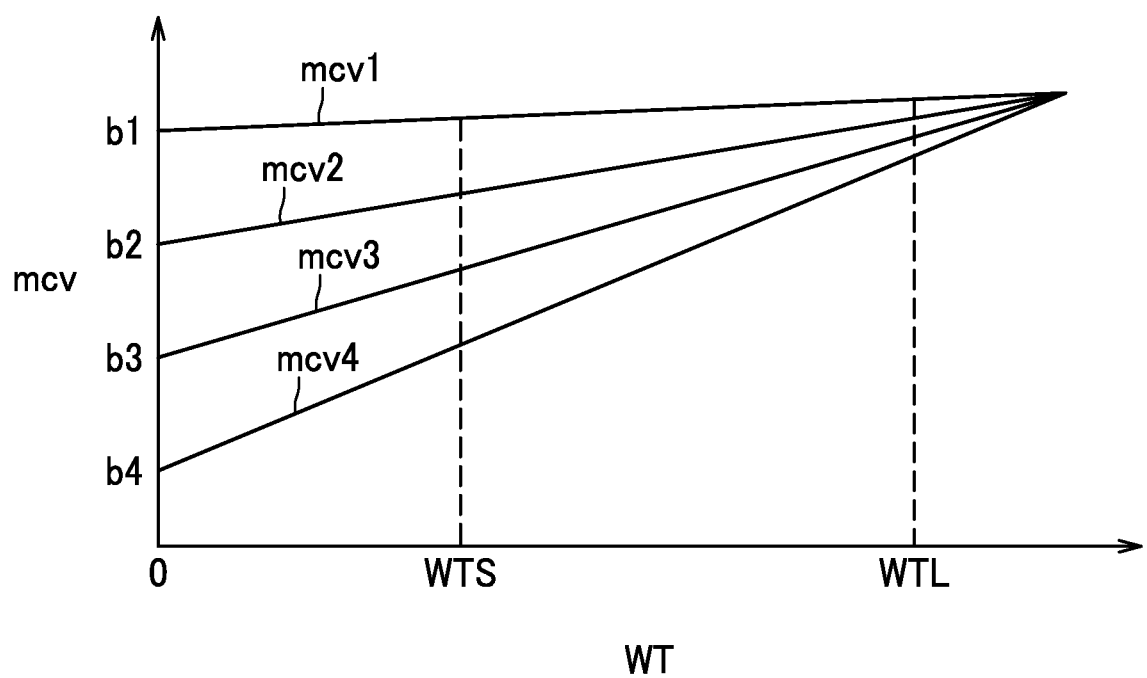
FIG. 14 is a map showing an example of a relationship of weight of the occupant and required control amount, in the fourth embodiment.

As shown in FIG. 14, expression (1) which calculates the required control amount mcv1 of the main heater 10 has been set as a value which does not vary that significantly even when the occupant's weight WT varies. Accordingly, by making the main heater 10 output with the required control amount mcv1, the control unit 100 does not let the output of the main heater 10 to vary substantially even when the occupant's weight WT varies.

On the other hand, expression (2) which calculates the required control amount mcv2 of the first heater portions 21A and 22A has been set as a value such that when the occupant's weight WT becomes smaller, the required control amount becomes smaller as compared to the case of expression (1). Accordingly, by making the first heater portions 21A and 22A output with the required control amount mcv2, the control unit 100 makes the output of the first heater portions 21A and 22A smaller in direct proportion to the occupant's weight WT as compared to the case of the main heater 10.

Moreover, expression (3) which calculates the required control amount mcv3 of the second heaters 21B and 22B have been set as a value such that the required control amount becomes smaller than the amount in expression (2) when the occupant's weight WT becomes smaller. Accordingly, by making the second heater portions 21B and 22B output with the required control amount mcv3, the control unit 100 makes the output of the second heater portions 21B and 22B smaller in direct proportion to the occupant's weight WT as compared to the case of the first heater portions 21A and 22A.

Moreover, expression (4) which calculates the required control amount mcv4 of the third heater portions 21C and 22C has been set as a value such that the required control amount becomes smaller than the amount in expression (3) when the occupant's weight WT becomes smaller. Accordingly, by making the third heater portions 21C and 22C output with the required control amount mcv4, the control unit 100 makes the output of the third heater portions 21C and 22C smaller in direct proportion to the occupant's weight WT as compared to the case of the second heater portions 21B and 22B.

A processing of the control unit 10 in the above-described car seat S will be described below with reference to FIG. 15.

Figure 15:
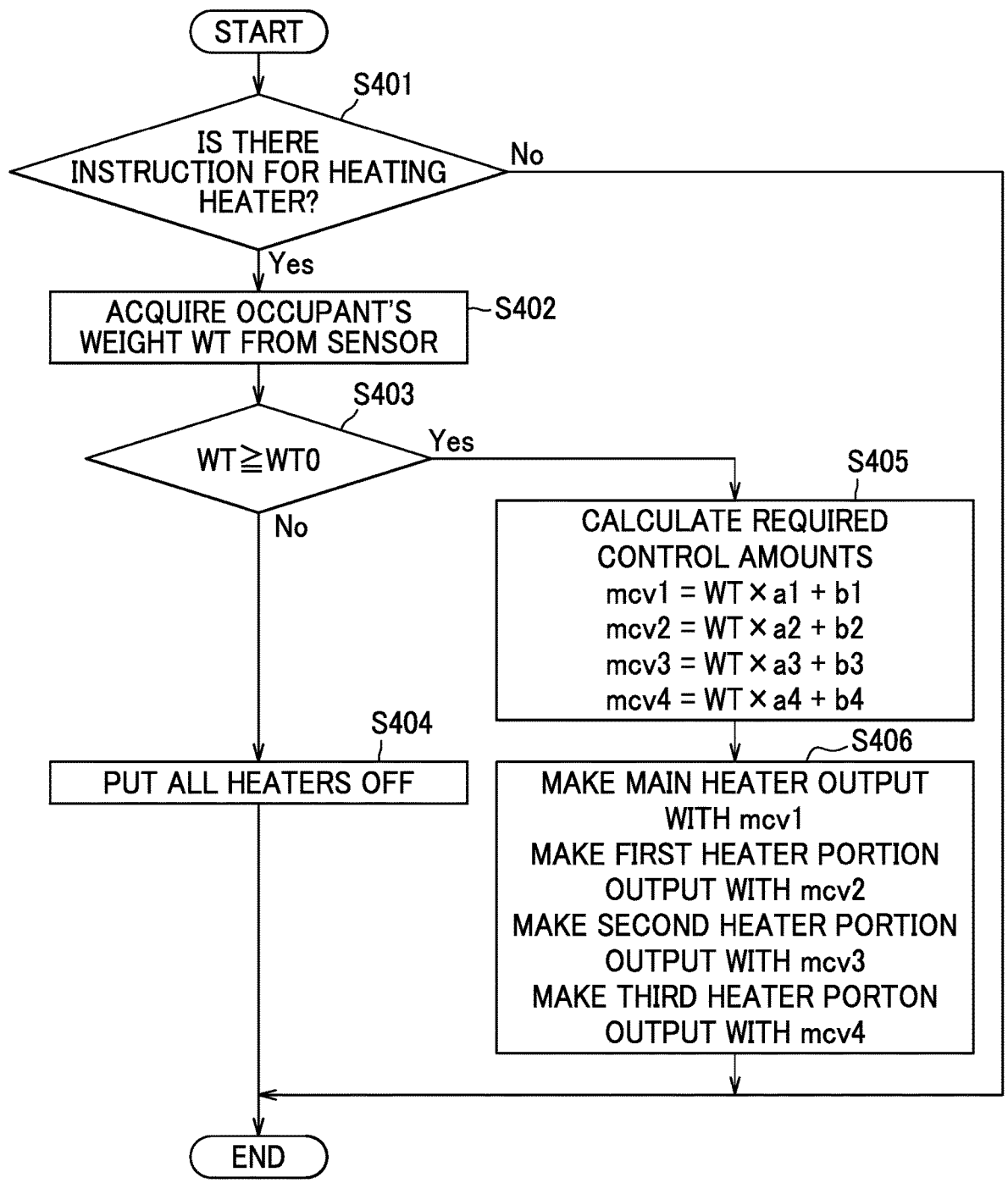
FIG. 15 is a flowchart showing a processing of the control unit in the fourth embodiment.

The control unit 100 repeatedly carries out a processing from a start to an end shown in FIG. 15 for each control cycle.

The control unit 100, to start with, makes a judgment of whether or not an instruction for heating by a heater has been received (step S401). If there is no instruction for heating by a heater (No at step S401), the control unit 100 terminates the processing. On the other hand, if there is an instruction for heating by the heater (Yes at step S401), the control unit 100 acquires the occupant's weight WT from the seat-weight sensor 40 (step S402), and makes a judgment of whether or not the occupant's weight WT is more than or equal to the seating judgment threshold value WT0 (step S403).

If the occupant's weight WT is smaller than the seating judgment threshold value WT0 (No at step S403), the control unit 100 puts all the heaters in the OFF state (step S404), and terminates the processing.

If the occupant's weight WT is more than or equal to the seating judgment threshold value WT0 (Yes at step S403), the control unit 100 calculates each of the required control amount mcv1 of the main heater 10, the required control amount mcv2 of the first heater portions 21A and 22A, the required control amount mcv3 of the second heater portions 21B and 22B, and the required control amount mcv4 of the third heater portions 21C and 22C (step S405). Moreover, the control unit 100 makes the main heater 10 output with the required control amount mcv1, makes the first heater portions 21A and 22A output with the required control amount mcv2, makes the second heater portions 21B and 22B output with the required control amount mcv3, and makes the third heater portions 21C and 22C with the required control amount mcv4 (step S406), and terminates the processing.

According to the processing as described above, as shown in FIG. 14, if an occupant with a large body frame (refer to an occupant's weight WTL) whose body contacts all of the main heater 10, the first heater portions 21A and 22A, the second heater portions 21B and 22B, and the third heater portions 21C and 22C of the sub-heater 20 sits in the car seat S, the output of each heater (required control amount mcv) becomes almost the same, and the heaters are warmed up substantially uniformly, to thereby secure the comfort. On the other hand, if an occupant with a small body frame (refer to an occupant's weight WTS) whose body contacts the main heater 10 but less likely contacts other heater portions gradually in order of the first heater portions 21A and 22A, the second heater portions 21B and 22B, and the third heater portions 21C and 22C sits in the car seat S, the output of each heater (required control amount mcv) becomes smaller gradually in order of the first heater portions 21A and 22A, the second heater portions 21B and 22B, and the third heater portions 21C and 22C. This makes it possible to make the electrical power consumption small while securing the comfort.

According to the car seat S as described above in the present embodiment, similarly as in the third embodiment, the wasteful generation of heat by the heater portion not in contact with the occupant with a small body frame can be suppressed, so that the electric power consumption in the car seat S can be reduced.

Further, in the present embodiment, the temperature of the sub-heater 20 can be controlled to be gradually lowered from the heater portion disposed at a position closer to the seating surface portion S11 of the seat cushion S1 toward the heater portion disposed at a position farther from the seating surface portion S11 of the seat cushion S1, or more specifically, in order of the first heater portions 21A and 22A, the second heater portions 21B and 22B, and the third heater portions 21C and 22C, so that increased temperature difference between the heater portions can be suppressed. This can improve the comfort of the occupant.

The third embodiment and the fourth embodiment of the present invention have been described above. However, the present invention is not limited to the embodiments as described above, and changes or modifications may be made to the structure thereof where appropriate.

For example, in the third embodiment, the output of the sub-heater 20 is 0 if the occupant's weight WT is smaller than the standard. However, the present invention is not limited to this specific control, and the output of the sub-heater may be made smaller in proportion to the occupant's weight becoming smaller. Further, in the fourth embodiment, the output of the sub-heater 20 is made smaller gradually in the order of the first heater portions 21A and 22A, the second heater portions 21B and 22B, and the third heater portions 21C and 22C. However, the present invention is not limited to this specific control, and the output of the sub-heater may be made 0 gradually in order of the third heater portions, the second heater portions, and the first heater portions as the occupant's weight becomes smaller.

In the fourth embodiment, the plurality of heater portions (the first heater portions 21A and 22A, the second heater portions 21B and 22B, and the third heater portions 21C and 22C) of the sub-heater 20 are disposed side-by-side in the leftward-rightward direction. However, the present invention is not limited to this specific arrangement. For example, the plurality of heater portions of the sub-heater may be disposed side-by-side in a frontward-rearward direction of the seat cushion, or may be disposed one above another in a vertical direction of the seat back. Moreover, the plurality of heater portions of the sub-heater are not limited to the three heater portions consisting of the first heater portions, the second heater portions, and the third heater portions, and may be two, or may be four or more than four.

In the third embodiment and the fourth embodiment, the main heater 10 is provided to the seating surface portions S11 and S21, and the sub-heater 20 is provided to the bulging portions S12 and S22. However, the present invention is not limited to this specific arrangement. For example, both the main heater and the sub-heater may be provided to the seating surface portion, or both the main heater and the sub-heater may be provided to the bulging portion. Moreover, the main heater may be provided to the seating surface portion of the seat cushion, and the sub-heater may be provided to the bulging portion of the seat cushion, and to the seating surface portion and the bulging portion of the seat back.

Further, in the third embodiment and the fourth embodiment, the sub heater 20 is disposed on each of left and right outer sides of the main heater 10. However, the present invention is not limited to this specific arrangement. For example, the sub-heater may be provided only one of the left and right sides of the main heater. Moreover, the sub-heater and the main heater may be disposed one behind another in the frontward-rearward direction in the seat cushion, or may be disposed one above another in the vertical direction in the seat back.

In the third embodiment and the fourth embodiment, the seat-weight sensor 40 has been exemplified as the physique detecting unit. However, the physique detecting unit is not limited to this specific sensor. For example, the physique detecting unit may be a pressure sensor. In this case, the pressure sensor may be disposed on the seating surface portion and the bulging portion of the seat, and a sub-heater may be provided to a seating surface portion and a bulging portion of the seat corresponding to the pressure sensor, so that if there is an instruction for heating by a heater, for example, the control unit 100 puts the sub-heater corresponding to the pressure sensor that has detected an occupant, in the ON state in which the electric power is supplied, and puts the sub-heater corresponding to the pressure sensor that does not detect an occupant, in the OFF state in which no electric power is supplied. Accordingly, the output of at least a part of the sub-heater can be reduced. Moreover, the physique detecting unit may be a camera that captures an occupant sitting in the car seat. In this case, the physique of the occupant is judged from an image or a moving image of the occupant acquired by the camera, and the output of the sub-heater is controlled on the basis of this judgment result. The judgment of the physique of the occupant may be made by a control unit provided with a function section for a physique judgment or by a judging unit to be provided separately from the control unit.

In the third embodiment and the fourth embodiment, although an independent type seat that is to be used for a driver's seat and a front passenger seat of an automobile has been exemplified as the car seat S, the seat is not limited to this specific type, and may be a bench type seat that is commonly used for a backseat of an automobile. Moreover, in the third embodiment and the fourth embodiment, although the car seat S that is mounted in a car has been exemplified as a seat, the seat may be a vehicle seat to be mounted in a railway car, a marine vessel, and an aircraft. Furthermore, the seat is not limited to a vehicle seat, and may be a seat used in a house for example.

In the third embodiment and the fourth embodiment, although the seat has a configuration such that the electric power is supplied from the power-supply unit 90 that is driven by the battery mounted in the vehicle, the present invention is not limited to this specific configuration. For instance, the battery may be mounted in the seat. Further, if the seat is a seat intended for home use, the electric power may be supplied from a commercial power supply.

Each of the elements explained in the above-described embodiments and modified embodiments may be optionally combined.

The invention claimed is:
1. A seat comprising:
a main heater;
a sub-heater that is disposed at a position farther from a seating surface portion of a seat cushion, than the main heater;
a physique detector configured to detect a physique of an occupant seated in the seat; and
a control unit configured to control an output of the main heater and an output of the sub-heater,
wherein the control unit reduces at least a partial output of the sub heater when the physique of the occupant detected by the physique detector is smaller than a standard than when the physique of the occupant detected by the physique detector is not smaller than the standard.

2. The seat according to claim 1, wherein the sub-heater is disposed on left and right outer sides of the main heater.

3. The seat according to claim 1, wherein the control unit stops an electric power supply to at least a part of the sub-heater if the physique of the occupant detected by the physique detector is smaller than the standard.

4. The seat according to claim 1, wherein the sub-heater includes a plurality of heater portions, and
wherein the control unit controls, if the physique of the occupant detected by the physique detector is smaller than the standard, such that the farther the position of the heater portion from among the plurality of heater portions, disposed from the seating surface portion of the seat cushion, the smaller is the output.

5. The seat according to claim 1, wherein the sub-heater includes:
a first heater portion;
a second heater portion that is disposed at a position farther from the seating surface portion of the seat cushion, than a position of the first heater portion; and
a third heater portion that is disposed at a position farther from the seating surface portion of the seat cushion, than a position of the second heater portion, and
wherein the control unit controls, if the physique of the occupant detected by the physique detector is smaller than the standard, such that the output of the sub-heater is made smaller in order of the first heater portion, the second heater portion, and the third heater portion.

6. The seat according to claim 5, wherein the sub-heater is disposed on left and right sides of the main heater, and
wherein the first heater portion, the second heater portion, and the third heater portion are disposed side-by-side in this order from an inner side to an outer side in the leftward-rightward direction.

7. The seat according to claim 1, wherein the main heater includes a cushion main-heater disposed on the seating surface portion of the seat cushion, and a back main-heater disposed on a seating surface portion of a seat back,
wherein the sub-heater includes a cushion sub-heater disposed on left and right outer sides of the seating surface portion of the seat cushion, and a back sub-heater disposed on left and right outer sides of the seating surface portion of the seat back, and
wherein the control unit stops an electric power supply to the back sub-heater if the physique of the occupant detected by the physique detector is smaller than a first standard, and stops the electric power supply to the back sub-heater and the cushion sub-heater if the physique of the occupant detected by the physique detector is smaller than a second standard that is smaller than the first standard.

8. The seat according claim 1, wherein the main heater is provided to the seating surface portion of the seat, and
wherein the sub-heater is provided to a bulging portion that is disposed on left and right outer sides of the seating surface portion, and that juts out toward the occupant for supporting a side portion of the occupant.

* * * * *